(12) United States Patent
Adema

(10) Patent No.: US 12,158,591 B2
(45) Date of Patent: Dec. 3, 2024

(54) MULTI-PIVOT HINGE FOR HEAD MOUNTED WEARABLE DEVICE

(71) Applicant: Google LLC, Mountain View, CA (US)

(72) Inventor: Daniel Adema, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/347,987

(22) Filed: Jul. 6, 2023

(65) Prior Publication Data
US 2024/0019704 A1    Jan. 18, 2024

Related U.S. Application Data

(60) Provisional application No. 63/368,305, filed on Jul. 13, 2022.

(51) Int. Cl.
*G02B 27/01* (2006.01)
*G02C 5/22* (2006.01)

(52) U.S. Cl.
CPC ....... *G02B 27/0176* (2013.01); *G02C 5/2236* (2013.01)

(58) Field of Classification Search
CPC .......................... G02B 27/0176; G02C 5/2236
USPC ............................................................. 345/8
See application file for complete search history.

(56) References Cited

U.S. PATENT DOCUMENTS

| | | | | |
|---|---|---|---|---|
| 6,421,031 B1* | 7/2002 | Ronzani | ............. | G02B 27/0172 359/630 |
| 6,424,321 B1* | 7/2002 | Ronzani | ............. | G02B 27/0176 345/87 |
| 9,529,201 B1* | 12/2016 | Blum | ........................ | G01B 7/14 |
| 11,314,314 B2* | 4/2022 | Okano | .................. | G06F 1/3215 |
| 2002/0008677 A1* | 1/2002 | Saito | .................. | G02B 27/0176 345/8 |
| 2009/0180194 A1* | 7/2009 | Yamaguchi | ........ | G02B 27/0176 359/15 |
| 2015/0054717 A1* | 2/2015 | Sugihara | ............ | G02B 27/0172 345/8 |
| 2016/0048036 A1* | 2/2016 | Cazalet | .............. | G02B 27/0176 16/228 |
| 2016/0116943 A1* | 4/2016 | Becze | ................... | H04W 68/00 361/679.28 |
| 2020/0050000 A1* | 2/2020 | Yoshida | .............. | E05D 11/0081 |
| 2023/0288711 A1* | 9/2023 | Gallaher | ................ | G02C 11/06 |

* cited by examiner

*Primary Examiner* — Tom V Sheng
(74) *Attorney, Agent, or Firm* — Brake Hughes Bellermann LLP

(57) ABSTRACT

A head mounted wearable computing device includes a frame including arm portions rotatably coupled to a front frame portion, with electronic components housed in and/or on the front frame portion and the arm portions. Cables run through hinge mechanisms rotatably coupling the arm portions and the front frame portion for connection of electronic components in the arm portions and the front frame portion. The hinge mechanism includes a dual pivot structure that guides the bending of cables through the hinge mechanism through approximately 90 degrees of bending through two pivot points. The dual pivot structure reduces localized strain on the cable through the range of motion of the hinge mechanism. The dual pivot structure allows for a rotation through the range of motion with little to no extra cable length to accommodate the bending of the cable.

19 Claims, 23 Drawing Sheets

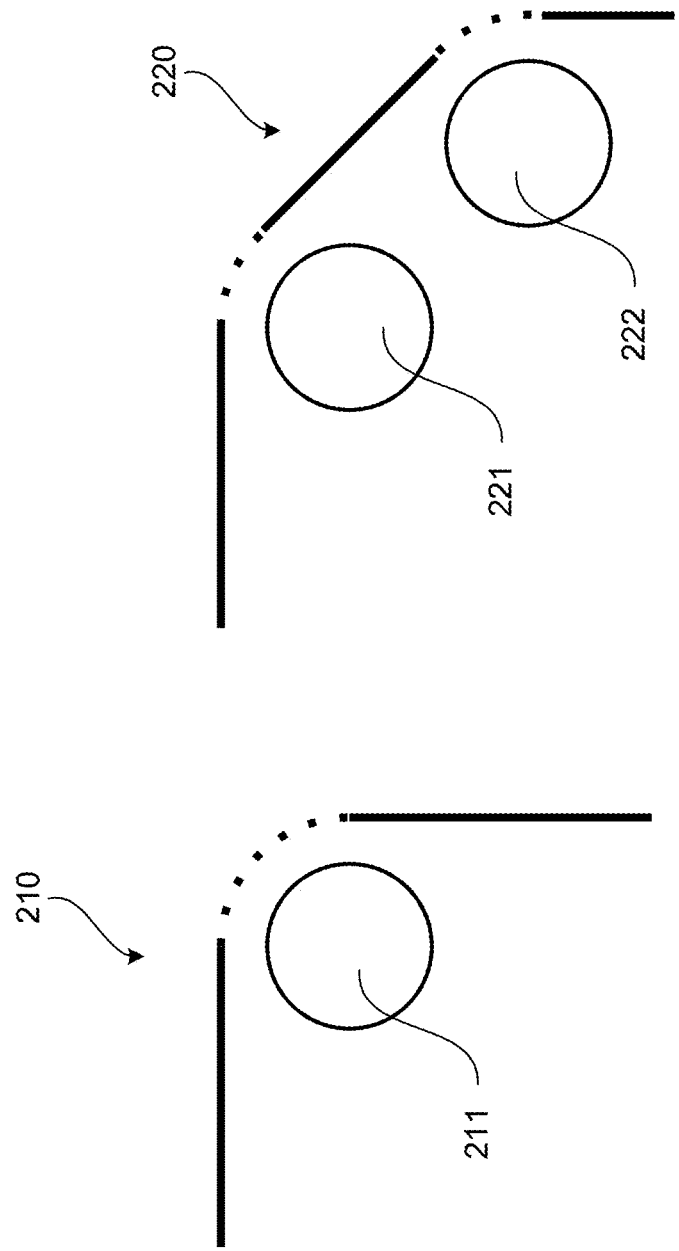

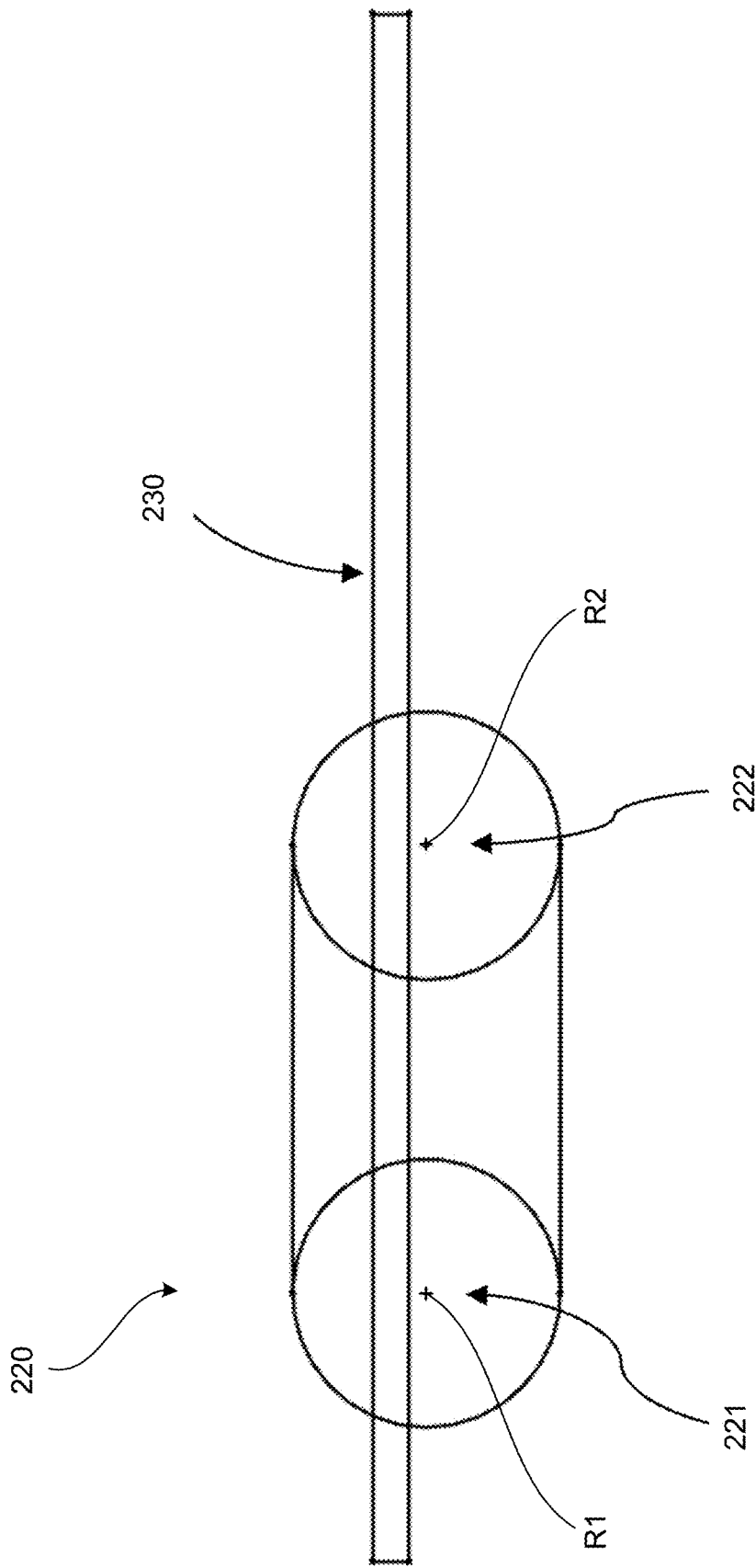

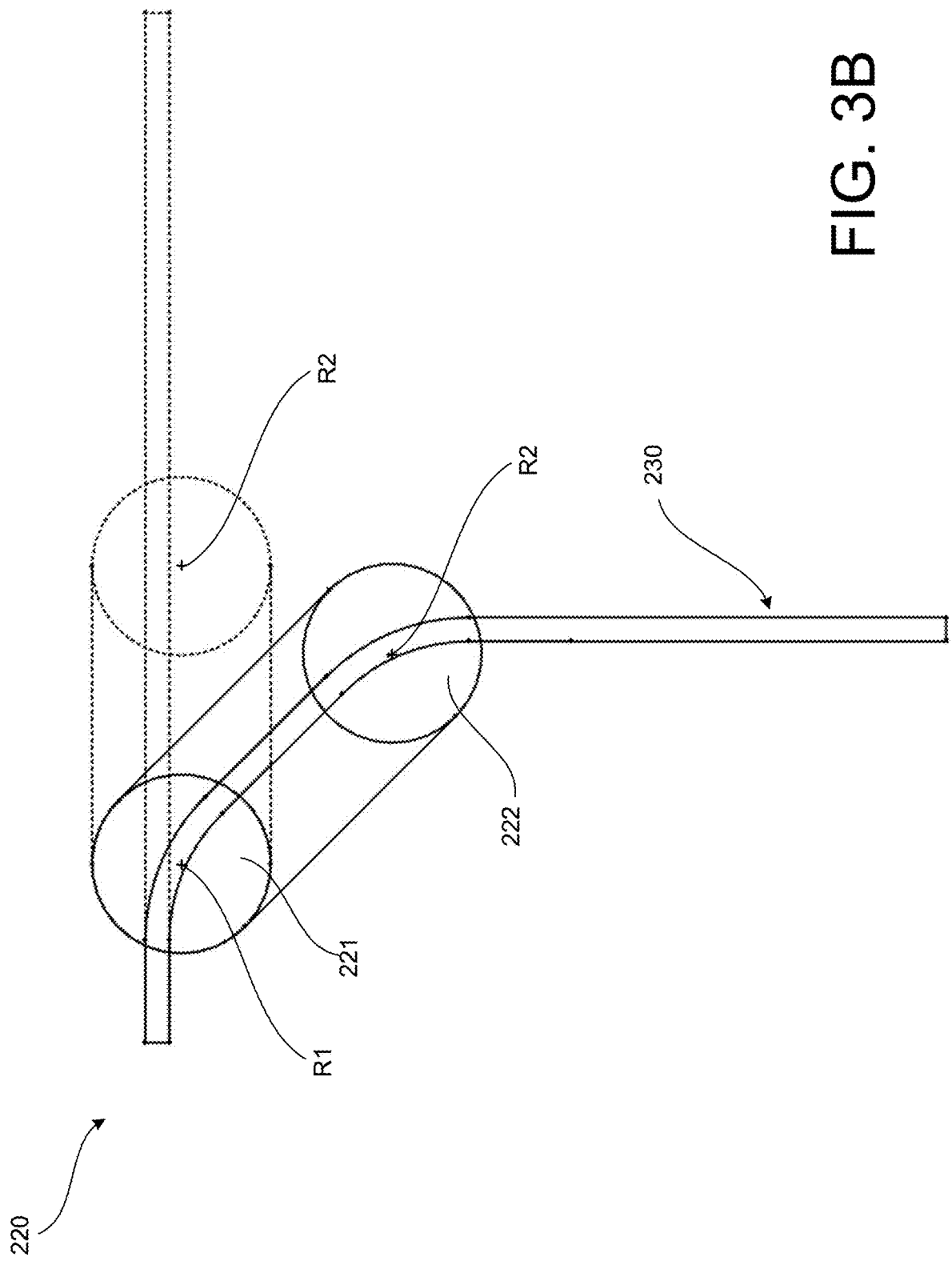

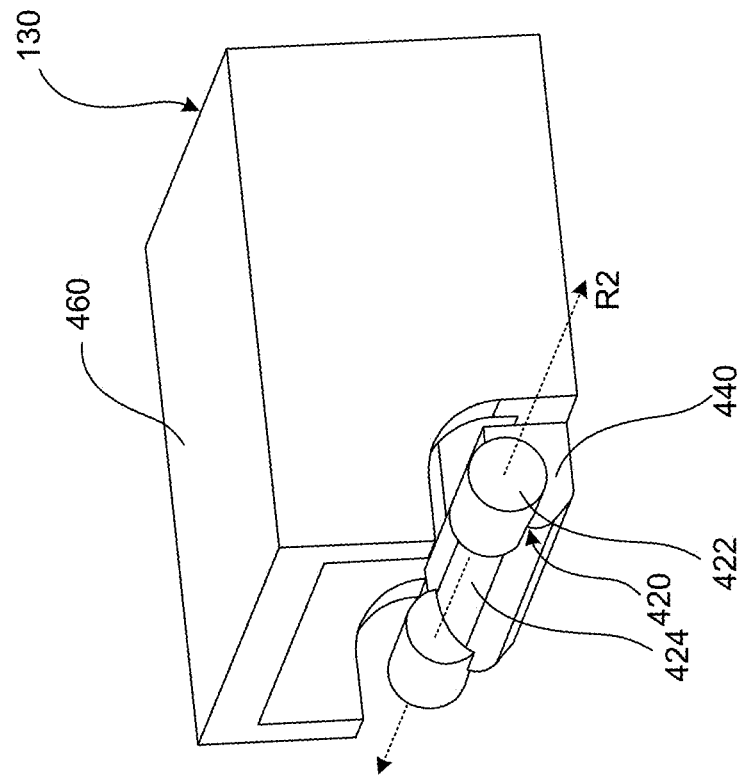
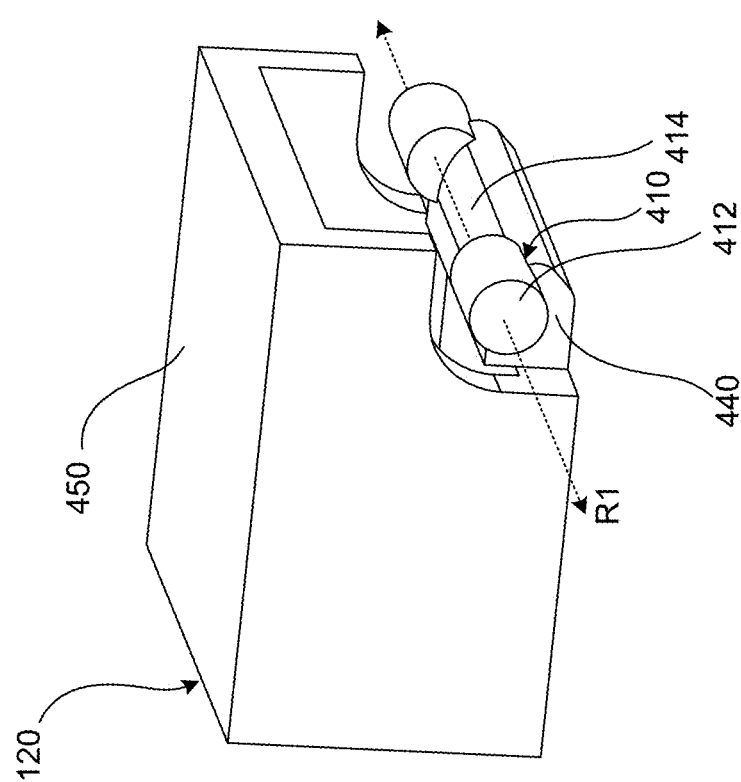
FIG. 4D

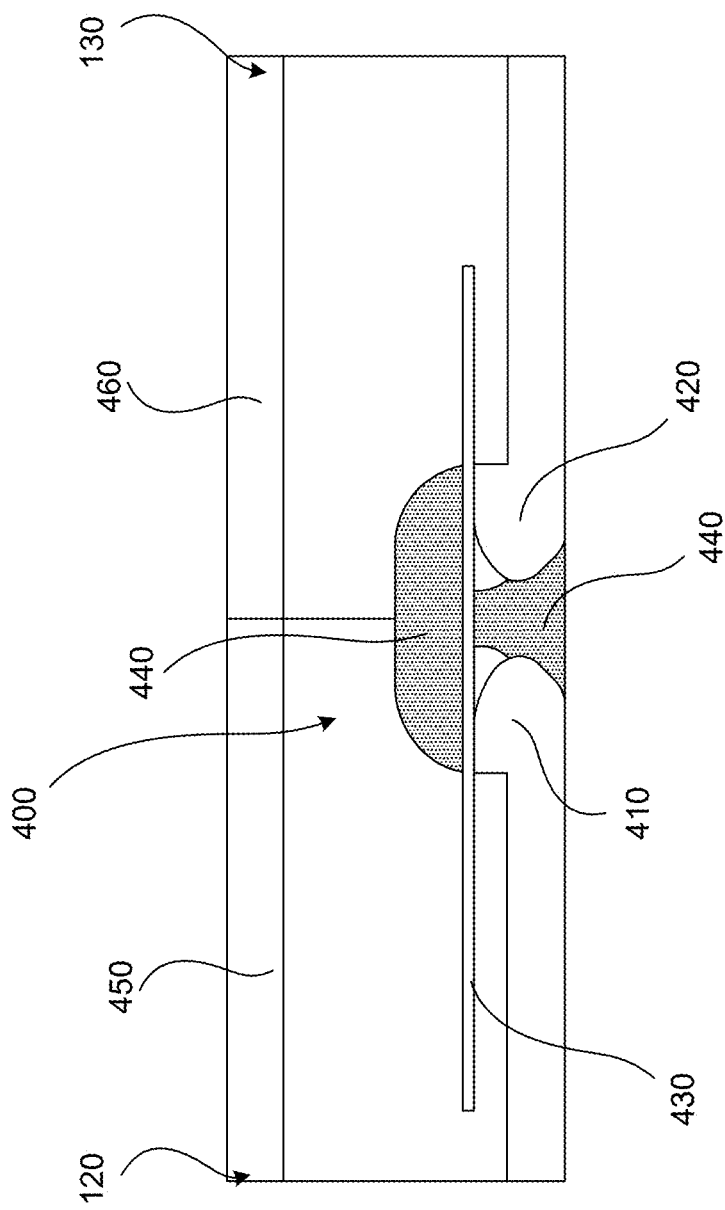

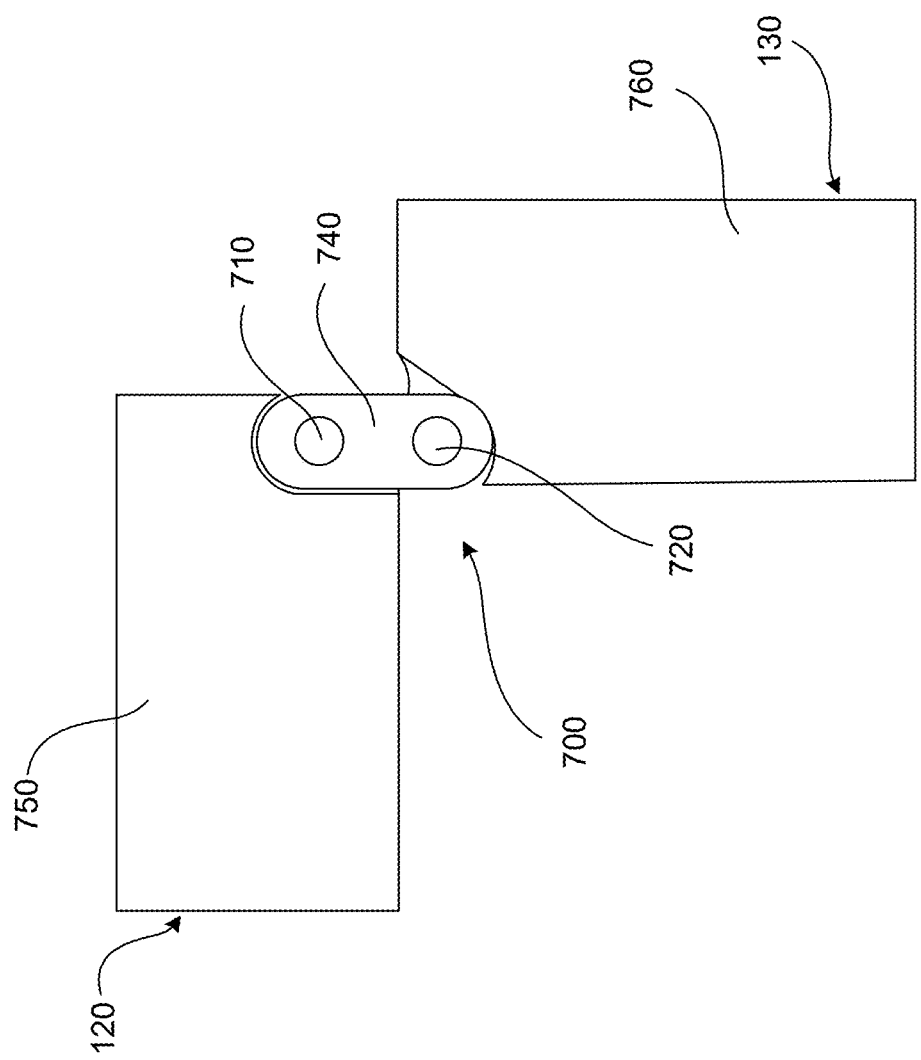

MULTI-PIVOT HINGE FOR HEAD MOUNTED WEARABLE DEVICE

CROSS REFERENCE TO RELATED APPLICATION

This application claims priority to U.S. Provisional Application No. 63/368,305, filed on Jul. 13, 2022, the disclosure of which is incorporated herein by reference in its entirety.

TECHNICAL FIELD

This description relates, in general, to head mounted wearable devices, and in particular, to a hinge for a head mounted wearable computing.

BACKGROUND

Eyewear in the form of glasses may be worn by a user to, for example, provide for vision correction, reduce the effect of sunlight and/or glare, provide a measure of safety, and the like. These types of eyewear are typically somewhat flexible and/or deformable, so that the eyewear can be manipulated to comfortably fit the user. In some situations, an ophthalmic technician may manipulate rim portions and/or temple arm portions of a frame of the eyewear, for example, through cold working the frame and/or heating and re-working the frame, to adjust the eyewear to meet the needs of a particular user. In some situations, hinge mechanisms provide for rotatable coupling of temple arm portions to a front frame portion of the frame of the eyewear, to provide for some level of adjustment and/or flexibility in the frame, to adapt to the needs of a particular user. In a situation in which the eyewear is a head mounted wearable computing device including a display, electronic components may be received in portions of the temple arm portions and the front frame portion of the frame. In some examples, communication between components in one or both of the temple arm portions and the front frame portion of the frame may rely on physical connections (i.e., wires/cables) that extend through the hinge mechanisms. Volume for accommodating these types of electronic components, connectors, and the like is somewhat constrained due to, for example, the form factor associated with a head mounted wearable computing device in the form of smart glasses, accessibility considerations, aesthetic considerations, and the like.

SUMMARY

In one general aspect, a head mounted wearable computing device includes a frame. The frame includes a front frame portion; and an arm portion coupled to the front frame portion. The head mounted wearable computing device also includes a hinge mechanism rotatably coupling the arm portion to the front frame portion of the frame, the hinge mechanism including a first pivot pin coupled to the front frame portion; a second pivot pin coupled to the arm portion; and a coupling structure coupling corresponding end portions of the first pivot pin and the second pivot pin. The head mounted wearable computing device also includes a flex cable extending through the hinge mechanism, connecting electronic components received in the front frame portion and electronic components received in the arm portion of the frame, wherein the first pivot pin and the second pivot pin are configured to guide a bending of the flex cable through a substantially full range of motion of the hinge mechanism, such that the first pivot pin provides for half of the bending of the flex cable associated with the substantially full range of motion of the hinge mechanism, and the second pivot pin provides for half of the bending of the flex cable associated with the substantially full range of motion of the hinge mechanism.

In some implementations, the substantially full range of motion of the hinge mechanism is approximately 90 degrees, and the first pivot pin provides for approximately 45 degrees of bending of flex cable, and the second pivot pin provides for approximately 45 degrees of bending of the flex cable.

In some implementations, a length of the flex cable, from a point at which the flex cable enters the hinge mechanism to a point at which the flex cable exits the hinge mechanism, is substantially the same throughout the range of motion of the hinge mechanism.

In some implementations, the first pivot pin includes a cam surface that is offset from an axis of rotation of the first pivot pin, wherein the cam surface defines a guide surface for guiding the bending of the flex cable at the first pivot pin, and the second pivot pin includes a cam surface that is offset from an axis of rotation of the second pivot pin, wherein the cam surface defines a guide surface for guiding the bending of the flex cable at the first pivot pin.

In some implementations, the second pivot pin is positioned at an offset from the first pivot pin, such that the flex cable is positioned between the first pivot pin and the second pivot pin.

In some implementations, the hinge mechanism includes a first guide pin; and
  a second guide pin, wherein the first guide pin is positioned such that the flex cable passes between the first pivot pin and the first guide pin, and the second guide pin is concentrically arranged with the second pivot pin.

In some implementations, in a fully open configuration of the hinge mechanism, the first guide pin and the second guide pin are separated by a first distance, and in a fully closed configuration of the hinge mechanism, the first guide pin and the second guide pin are separated by a second distance that is less than the first distance.

The details of one or more implementations are set forth in the accompanying drawings and the description below. Other features will be apparent from the description and drawings, and from the claims.

BRIEF DESCRIPTION OF THE DRAWINGS

FIGS. 2A-2C are schematic diagrams illustrating operation of a multi-pivot hinge mechanism, in accordance with implementations described herein.

FIGS. 3A and 3B are schematic diagrams illustrating operation of a multi-pivot hinge mechanism, in accordance with implementations described herein.

FIG. 4D is a partially exploded view of the example hinge mechanism shown in FIGS. 4A-4C.

FIG. 5A is a cross-sectional view, taken along line A-A of FIG. 4A.

FIG. 8C is a top view of the example hinge mechanism shown in FIG. 7, in a fully closed position.

DETAILED DESCRIPTION

This disclosure relates to a head mounted wearable computing device, and in particular, to a hinge mechanism for a head mounted wearable computing device in the form of smart glasses including display capability, computing/processing capability, and the like, in which a plurality of electronic components is disposed in and/or on specific portions of a frame of the smart glasses. In this situation, the form factor and associated installation volume associated with the head mounted wearable computing device, or smart glasses, may pose challenges in accommodating all of the components of the smart glasses in and/or on the installation volume defined by the frame. The need for placement of some components in and/or on specific portions of the frame may further complicate the accommodation of these components within the available installation volume. Communication and/or connection between components in the temple arm portion and components in the front frame portion of the frame may further complicate the installation of components. Functionality of certain components such as, for example, a display device, a gaze tracking device, speakers, microphones, and the like, may dictate specific placement of those in and/or on the installation volume defined by the frame to provide the desired functionality. Connection to a power storage device, or battery, provided in the temple arm portion may rely on wires and/or cables and/or other types of electrical connectors to pass through the hinge mechanisms rotatably coupling the temple arm portions to the front frame portion. A hinge mechanism, in accordance with implementations described herein, incorporates a dual pivot hinge that guides a cable between the temple arm portion and the front frame portion of the frame, while avoiding kinks in the cable and maintaining a relative constant flex length in the cable.

Figure 1A:
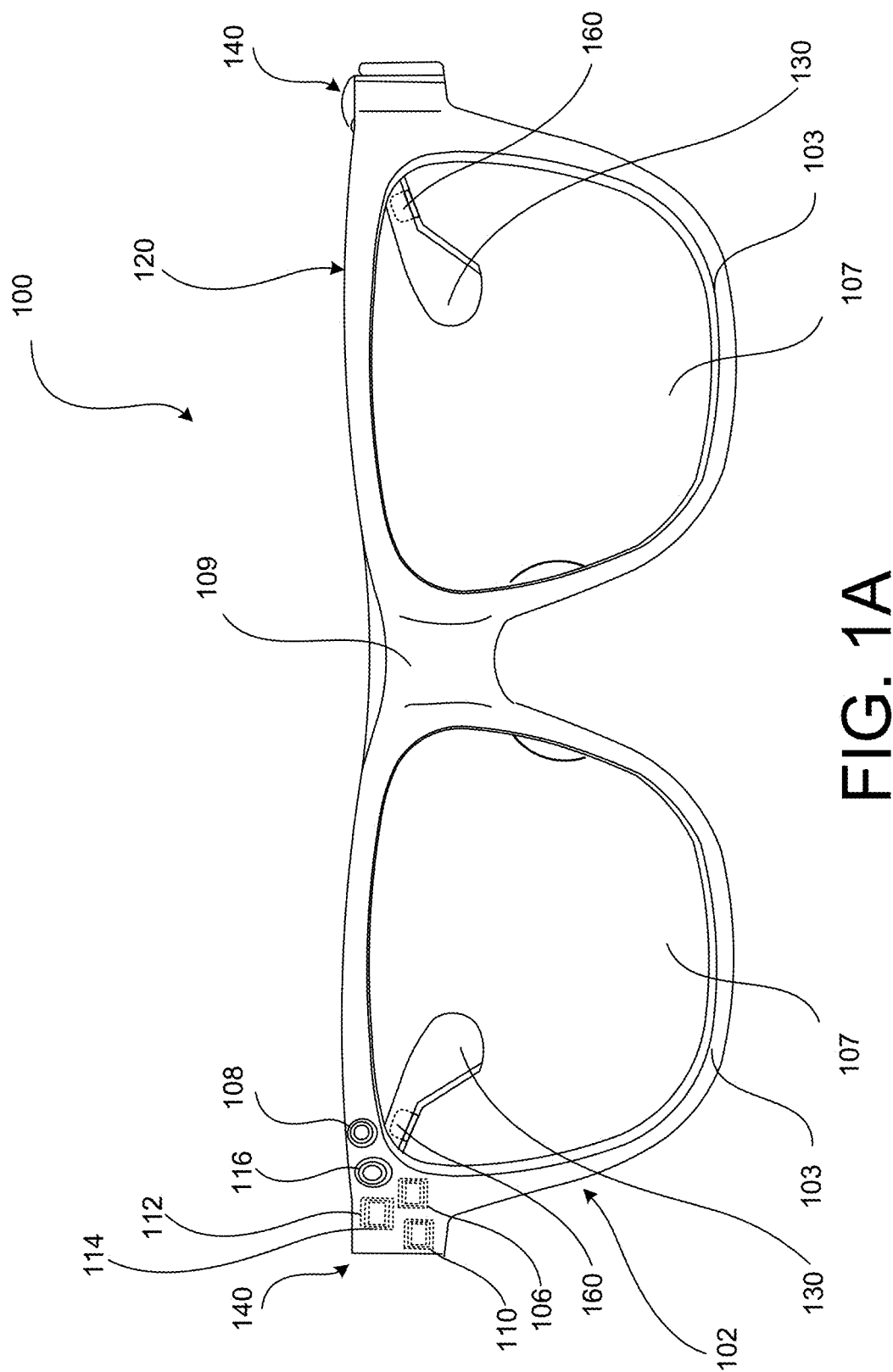
FIG. 1A is a front view of an example head mounted wearable computing device.
Figure 1B:
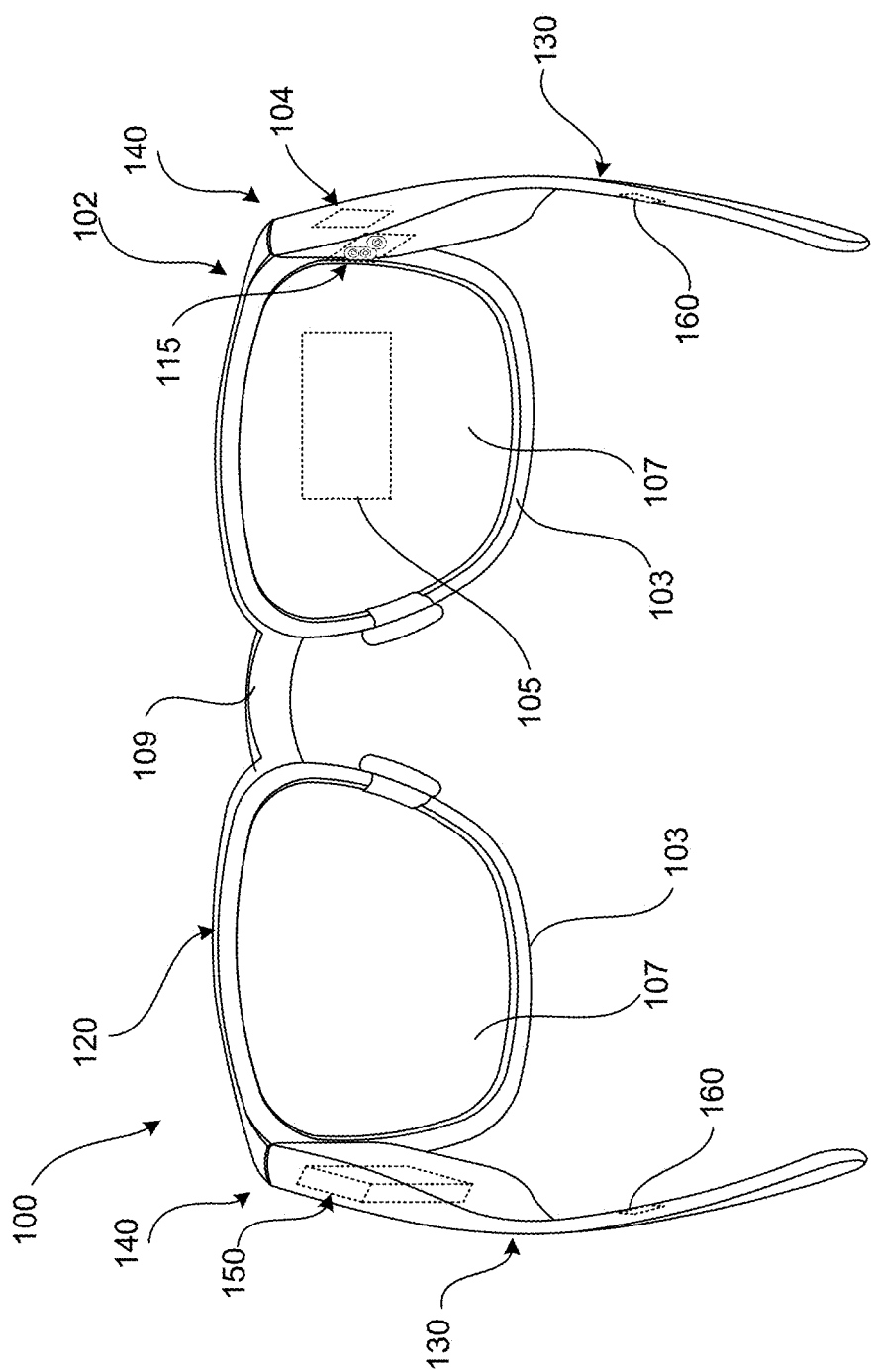
FIG. 1B is a rear view of the example head mounted wearable computing device shown in FIG. 1A.
Figure 1C:
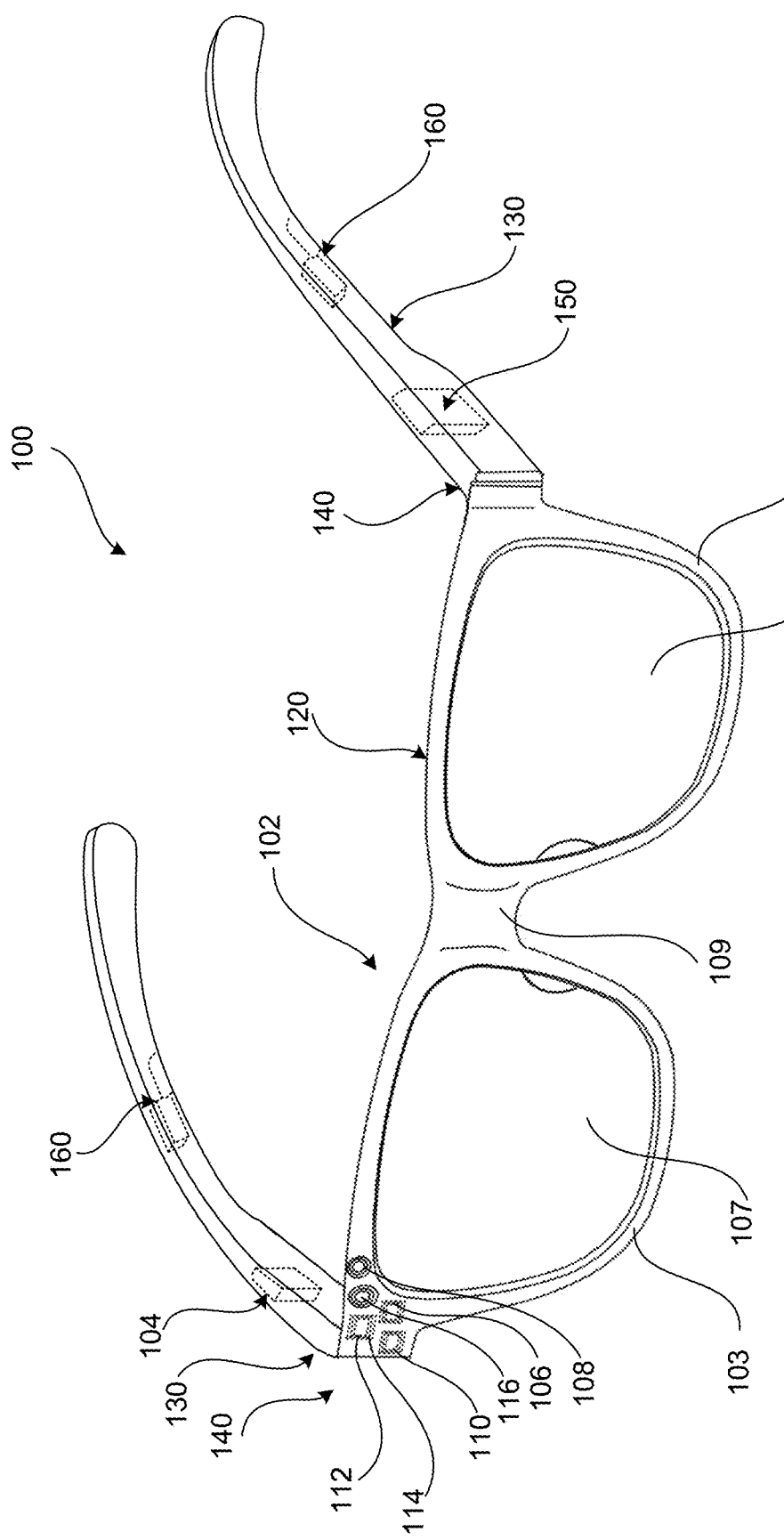
FIG. 1C is a perspective view of the example head mounted wearable computing device shown in FIGS. 1A and 1B.
Figure 1D:
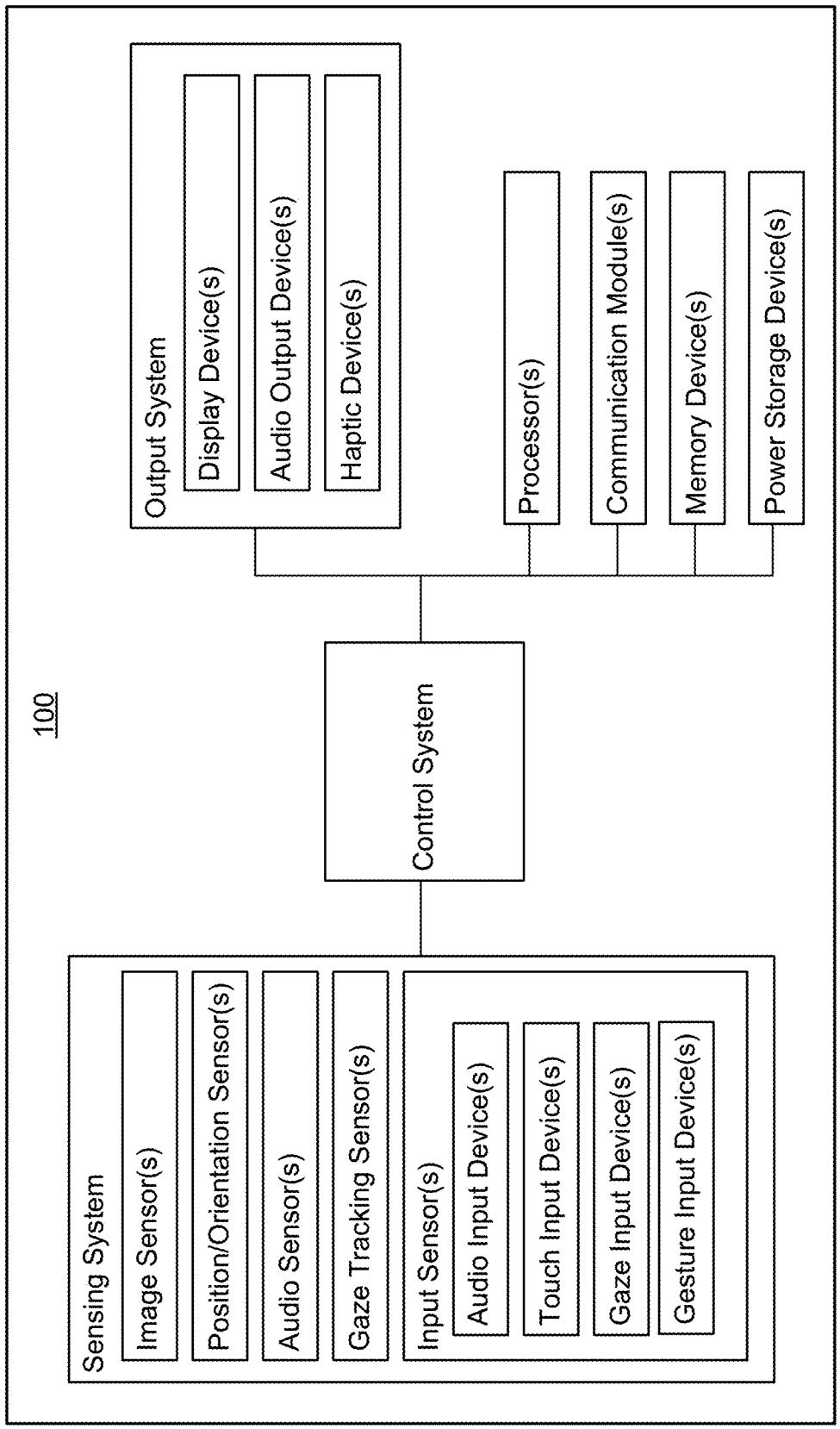
FIG. 1D is a block diagram of the example head mounted wearable computing device shown in FIGS. 1A-1C.

FIGS. 1A-1C illustrate features of an example head mounted wearable device 100, or smart glasses. In particular, FIG. 1A is a front view, FIG. 1B is a rear view, and FIG. 1C is a perspective view of the example head mounted wearable device 100. FIG. 1D is a block diagram of the example head mounted wearable device 100 shown in FIGS. 1A-1C. The features of the hinge mechanism, in accordance with implementations described herein, are described with respect to incorporation into the example head mounted wearable device 100, simply for purposes of discussion and illustration. The principles to be described herein can be applied to other devices for which the ability to guide connectors through pivotably or rotatably coupled components may be beneficial.

The example head mounted wearable device 100 includes a frame 102. The frame 102 includes a front frame portion 120, including rim portions 103 surrounding glass portions, or lenses 107. In some examples, the lenses 107 may be corrective/prescription lenses. In some examples, the lenses 107 may be glass portions that do not necessarily incorporate corrective/prescription parameters. In some examples, a bridge portion 109 connects the rim portions 103 of the front frame portion 120 of the frame 102. A pair of arm portions 130 are coupled, for example, rotatably coupled, to the front frame portion 120 at each rim portion 103. In some examples, a hinge portion 140 provides for the rotatable coupling of each arm portion 130 relative to the front frame portion 120. In some examples, the frame 102, including the rim portions 103 and the bridge portion 109 defining the front frame portion 120, and the arm portions 130 define a housing of the example head mounted wearable device 100, in which components of the example computing device are received.

The example head mounted wearable device 100, or smart glasses, as shown in FIGS. 1A-1C, includes a display device 104, an audio input device 106, or microphone, an illumination device 108, a sensing system 110, a control system 112, at least one processor 114, and an outward facing image sensor 116 (for example, a camera). In some examples, the sensing system 110 includes various sensing devices, and the control system 112 includes various control system devices including, for example, the at least one processor 114 operably coupled to the components of the control system 112.

In some examples, the display device 104 outputs visual content, under the control of the control system 112, for example, at an output coupler 105, so that the visual content is visible to the user. In the example shown in FIGS. 1A-1C, the display device 104 is provided in one of the two arm portions 130, simply for purposes of discussion and illustration. Display devices 104 can be provided in each of the two arm portions 130 to provide for binocular output of content. In some examples, the display device 104 is a see-through near eye display. In some examples, the display device 104 is configured to project light from a display source onto a portion of teleprompter glass functioning as a beamsplitter seated at an angle (for example, 30-45 degrees, or other angle based on the overall configuration of the head mounted wearable device 100). In some examples, the beamsplitter generates reflection and transmission values that allow light from the display device 104 to be partially reflected while remaining light is transmitted through the beamsplitter. In some examples, this type of optic design allows a user to see both physical items in the ambient environment, for example, through the lenses 107, together with content (for example, digital images, user interface elements, virtual content, and the like) output by the display device 104. In some examples, waveguide optics may be used to depict content by the display device 104.

In some examples, the audio input device 106 detects audio signals, for processing by the at least one processor 114 as an audio input command for execution by the control system 112. In some examples, image data detected by the image sensor 116 may be processed by the at least one processor 114 for the detection of gesture inputs to be executed by the control system 112. In some examples, touch inputs detected, for example by position/orientation sensor(s) of the sensing system 110 and/or at a touch sensitive surface (not shown in FIGS. 1A-1C) of the frame 102 may be processed by the at least one processor 114 as a touch input command for execution by the control system 112.

In some examples, the head mounted wearable device 100 includes a gaze tracking device 115 to detect and track eye gaze direction and movement. In some examples, data captured by the gaze tracking device 115 is processed by the at least one processor 114 to detect and track gaze direction and movement as a user input for execution by the control system 112. In the example shown in FIGS. 1A-1C, the gaze tracking device 115 is provided in one of the two arm portions 130, simply for purposes of discussion and illustration. In the example arrangement shown in FIGS. 1A-1C, the gaze tracking device 115 is provided in the same arm portion 130 as the display device 104, so that user eye gaze can be tracked not only with respect to objects in the physical environment, but also with respect to the content output for display by the display device 104. In some examples, a gaze tracking device 115 is provided in each of the two arm portions 130 to provide for gaze tracking of each of the two eyes of the user. In some examples, a display device 104 is provided in each of the two arm portions 130 to provide for binocular display of visual content. In some examples, the gaze tracking device 115 is provided in the front frame portion 120 of the frame 102, for example, at one or both of the rim portions 103.

The example head mounted wearable device 100, or smart glasses, includes an audio output device 160 (such as, for example, one or more speakers). In the example arrangement shown in FIGS. 1A-1C, an audio output device 160, or speaker, is provided in a housing defined by each of the two arm portions 130 of the frame 102.

In some examples, the head mounted wearable device 100 includes a power storage device 150, such as, for example, a battery, that provides power to the components of the head mounted wearable device 100. In the example shown in FIGS. 1A-1C, the power storage device 150 is included in a housing defined by one of the arm portions 130, simply for purposes of discussion and illustration. The principles to be described herein can be applied to a head mounted wearable device including more than one power storage device, arranged similarly or differently than shown in FIGS. 1A-1C.

In some examples, the display device 104, the audio output device 160, haptic devices (not shown in FIGS. 1A-1C), and other such devices, form an output system of the head mounted wearable device 100. In some examples, the audio input device 106, the gaze tracking device 115, the image sensor 116/gesture input device, the touch input device, and other such devices form an input system of the example head mounted wearable device 100. In some examples, one or more communication modules (not shown in FIGS. 1A-1C) provide for communication and exchange of information between the example head mounted wearable device 100 and other external devices. In some examples, one or more memory devices are accessible to the at least one processor 114 and the control system 112 for local storage of information.

In the head mounted wearable device 100, or smart glasses, described above, electronic components providing for the functionality of the head mounted wearable device 100 are received in and/or on housings or enclosures defined by the frame 102. In some examples, some of the electronic components are received in the front frame portion 120, and some of the electronic components are received in the arm portions 130. This arrangement of components relies on connections (i.e., cables, wires, etc.) that pass through the hinge portions 140. The form factor associated with the head mounted wearable device 100 poses space constraints in accommodating the electronic components in a functional and yet aesthetically pleasing manner. Connection of the components through the hinge portions 140 may rely on, for example, cables (for example, relatively flat, flex cables). Typically, extra length, or stress relief loops, are provided in the cable to accommodate the change in bend or turn length as the arm portion 130 pivots or rotates relative to the front frame portion 120. The stress loops have sufficiently large bend radii to prevent failure of the cable after some number of repeated open/close cycles. However, these stress loops/additional cable length consume already constrained space in the form factor associated with the head mounted wearable device 100.

A hinge mechanism, in accordance with implementations described herein, may guide electrical connectors (cables, wires and the like) through the hinge portions 140, using multiple pivot points to manage motion of the cable through the hinge mechanism and avoid over-stressing of the cables, while minimizing and/or eliminating the need for additional length in the cables to accommodate the pivoting/rotation of the arm portion 130 relative to the front frame portion 120 of the frame 102. In some examples, the hinge mechanism incorporates two approximately 45 degree bends, rather than a single 90 degree bend. This arrangement requires less cable length to compensate for changes in length as the arm portion 130 rotates relative to the front frame portion 120. This arrangement also avoids kinking of the cable, and damage to the cable during bending.

Figure 2C:
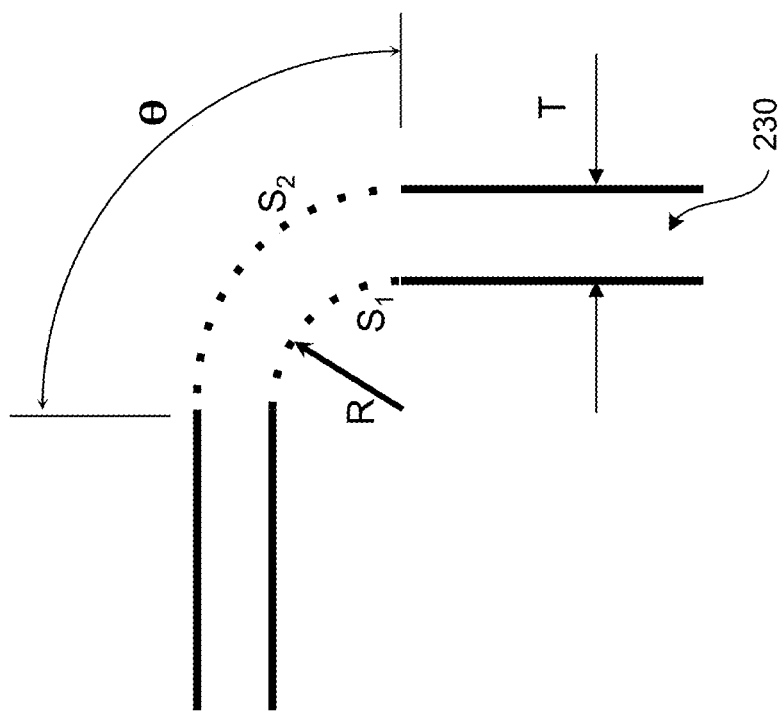

FIGS. 2A-2C are schematic illustrations of the operation of a multi-pivot hinge mechanism, in accordance with implementations described herein. In particular, FIG. 2A illustrates operation of a single pivot hinge arrangement 210 incorporating a single pivot 211 through a 90 degree bend. FIG. 2A illustrates operation of a dual pivot hinge arrangement 220 incorporating two pivots 221, 222 through two 45 degree bends. FIG. 2C illustrates the strain experienced by a cable 230 having a thickness T through a bend θ. Application of Equations 1, 2 and 3 below to FIG. 2C illustrate that a 45 degree bend experiences half the strain of that experienced by a 90 degree bend.

$$\text{Strain}(\varepsilon) \sim S2 - S1 \qquad \text{Equation 1}$$

$$\varepsilon \sim \theta(R+T) - \theta(R) \qquad \text{Equation 2}$$

$$\varepsilon \sim \theta(T) \qquad \text{Equation 3}$$

FIGS. 3A and 3B schematically illustrate the flex cable 230 guided by the first pivot 221 and the second pivot 222 of the dual pivot hinge arrangement 220. In particular, FIG. 3A illustrates a substantially zero bend or flex of the flex cable 230 through the dual pivot hinge arrangement 220. FIG. 3B illustrates an approximately 90 degree bend of the flex cable 230 through the dual pivot hinge arrangement 220

(with the zero bend of the flex of the flex cable 230 shown in dotted lines). In FIG. 3B, the 90 degree bend is achieved through an approximately 45 degree bend at the first pivot 221, and an approximately 45 degree bend at the second pivot 222. In this example arrangement, strain experienced by the flex cable 230 in the area of the first pivot 221 is approximately half that which would be experienced at that same portion of the flex cable 230 for a 90 degree bend. Similarly, strain experienced by the flex cable 230 in the area of the second pivot 222 is approximately half that which would be experienced at that same portion of the flex cable 230 for a 90 degree bend. Further, in this multi-pivot arrangement, in which bending of the flex cable 230 is accomplished over multiple pivot points, the cable 230 can maintain a substantially constant length, so that little to no extra cable length is required to accommodate the bending. That is, in this example arrangement, a length between two end points of the flex cable 230 can remain substantially constant and still accommodate the approximately 90 degree bend, thus eliminating the need for stress loops/extra cable length. For example, a length of the flex cable 230 can remain substantially constant, from a point at which the flex cable 230 enters a hinge mechanism facilitating the bending of the flex cable 230, to a point at which the flex cable 230 exits the hinge mechanism.

Figure 4A:
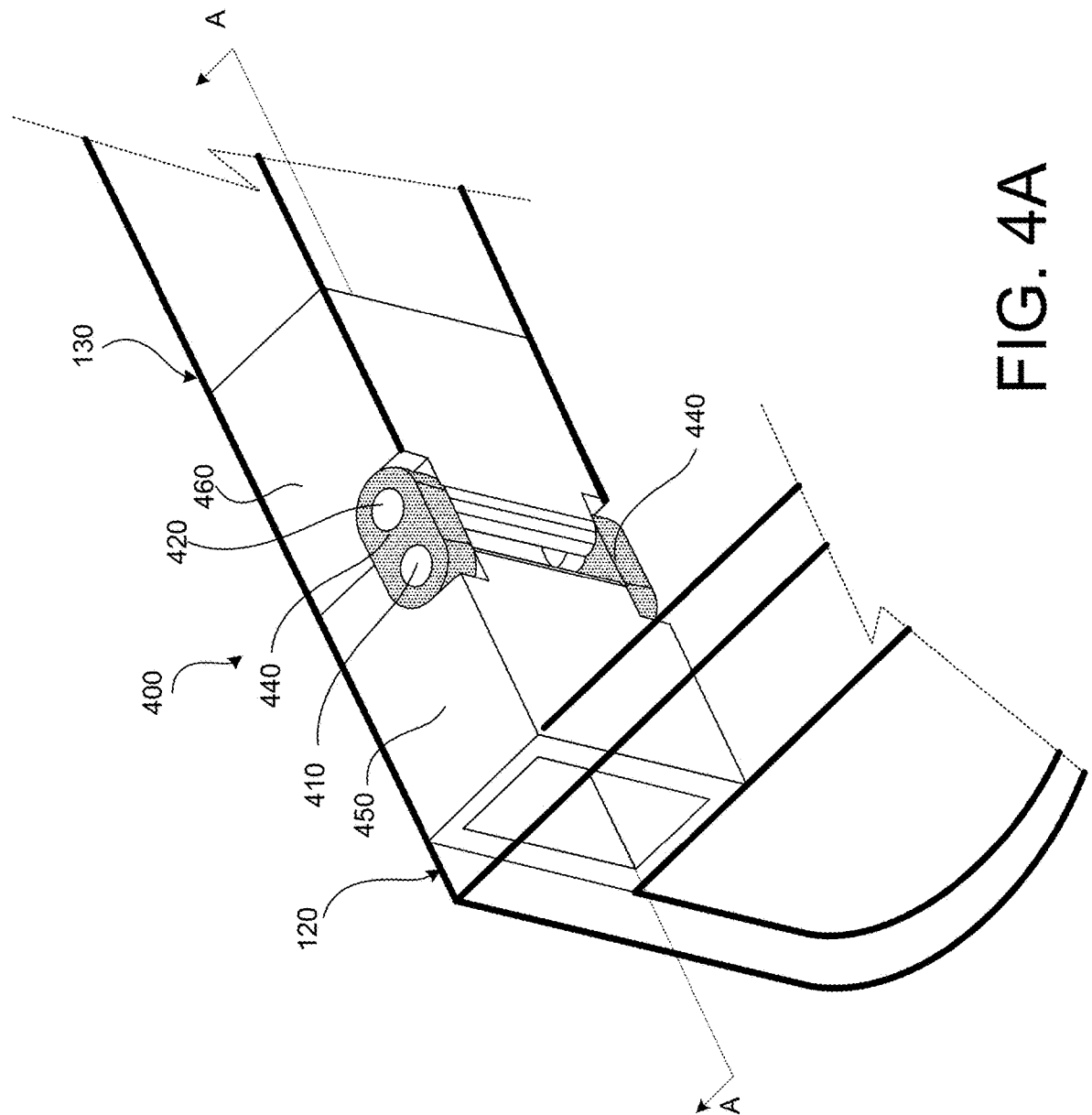
FIG. 4A is a perspective view of a fully open position of an example hinge mechanism, in accordance with implementations described herein.
Figure 4B:
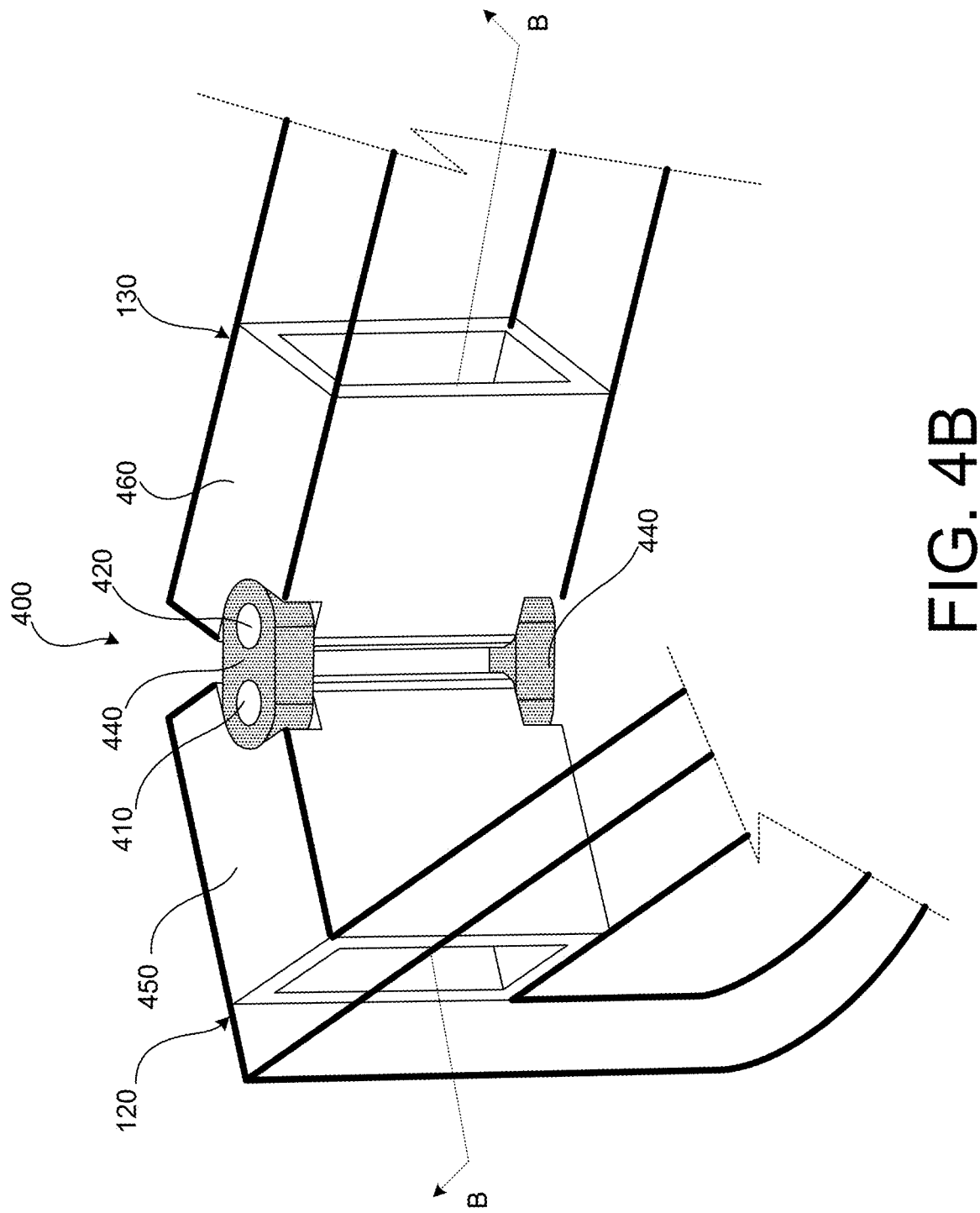
FIG. 4B is a perspective view of a partially closed position of the example hinge mechanism shown in FIG. 4A.
Figure 4C:
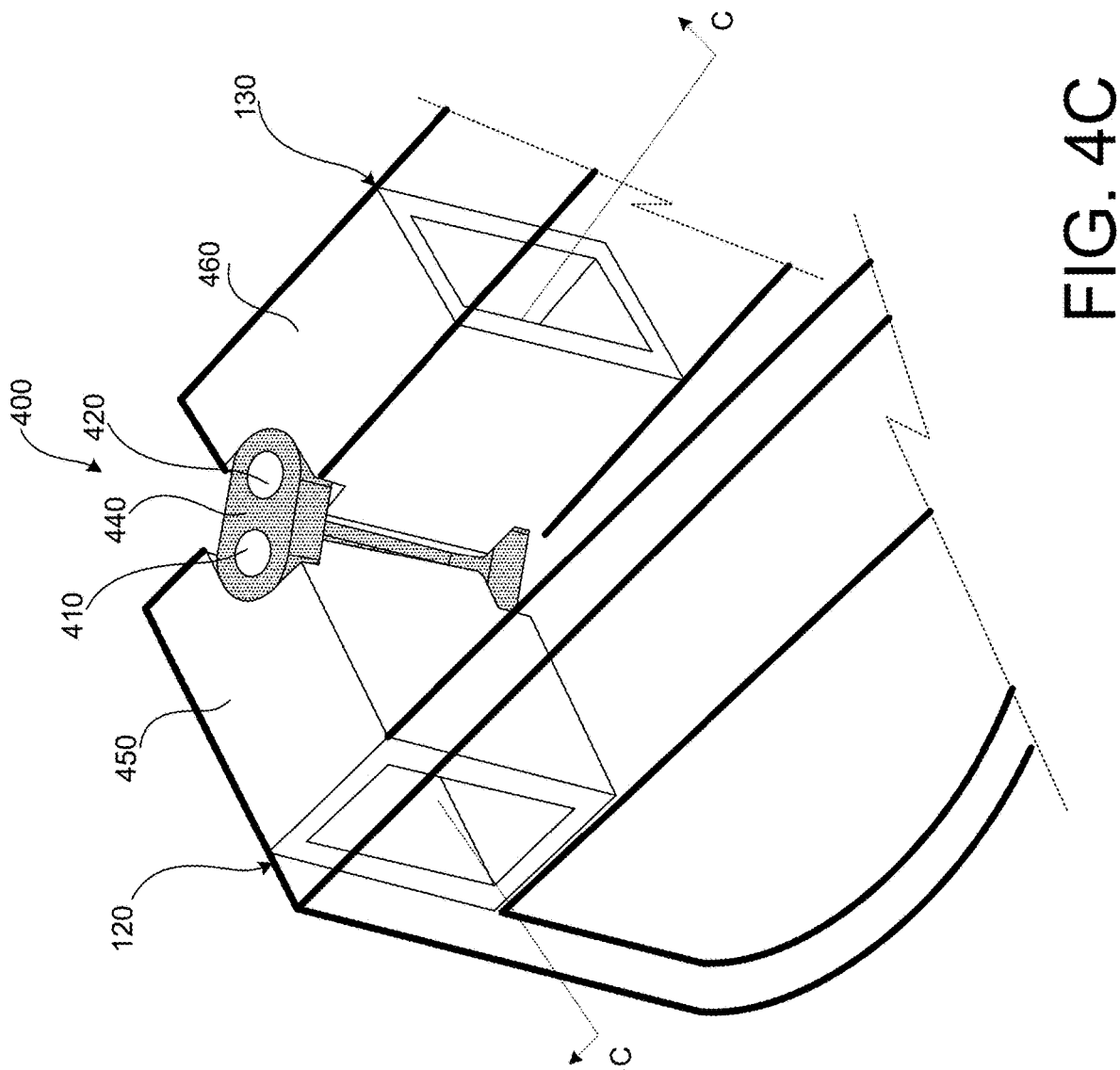
FIG. 4C is a perspective view of a fully closed position of the example hinge mechanism shown in FIGS. 4A and 4B.
Figure 5B:
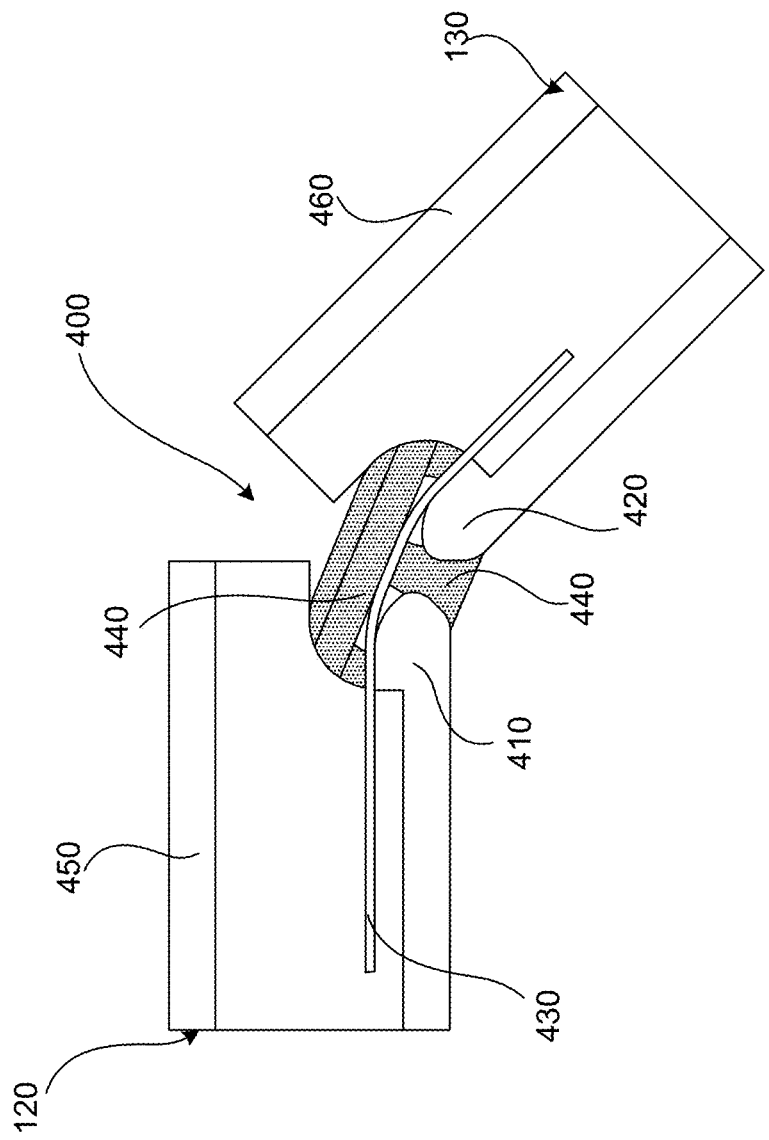
FIG. 5B is a cross-sectional view, taken along line B-B of FIG. 4B.
Figure 5C:
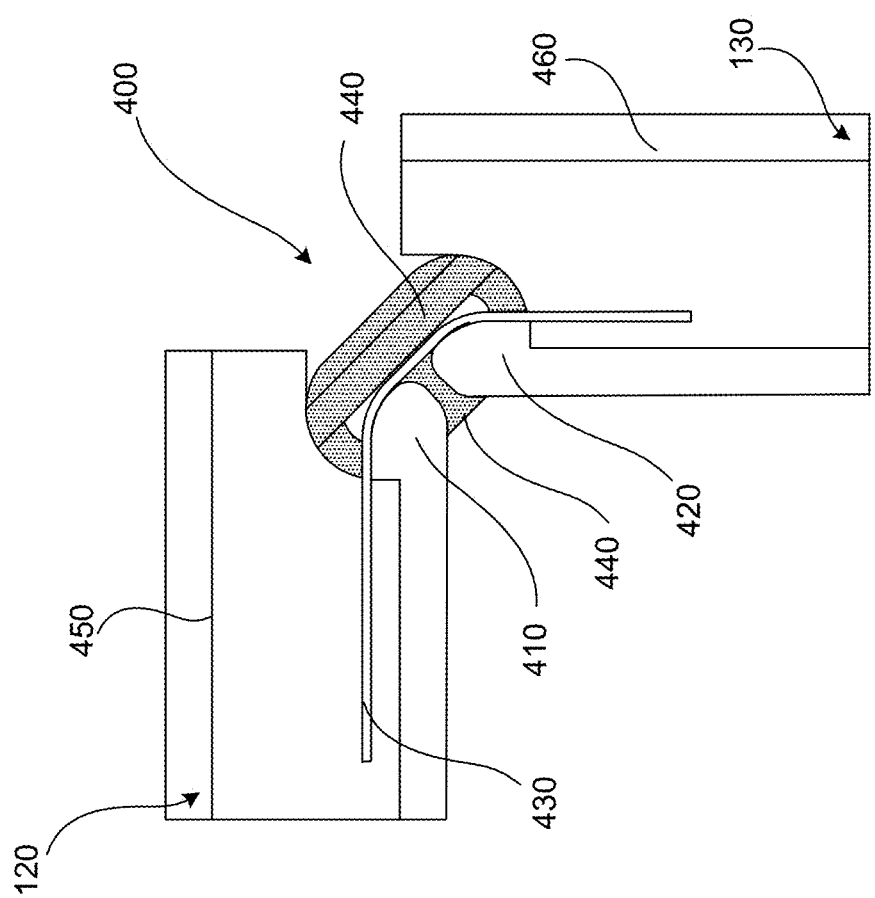
FIG. 5C is a cross-sectional view, taken along line C-C of FIG. 4C.

FIGS. 4A-5C illustrate operation of an example hinge mechanism 400, in accordance with implementations described herein. In the example arrangement shown in FIGS. 4A-4C, the example hinge mechanism 400 is provided at the hinge portion 140 of the example head mounted wearable device 100, providing for rotation of the arm portion 130 relative to the front frame portion 120 of the frame 102 of the head mounted wearable device 100. FIG. 4A illustrates a fully open position of the arm portion 130 relative to the front frame portion 120 of the frame 102. FIG. 4B illustrates a partially closed position of the arm portion 130 relative to the front frame portion 120 of the frame 102. FIG. 4C illustrates a fully closed position of the arm portion 130 relative to the front frame portion 120 of the frame 102. FIG. 4D is a partially exploded view of the example hinge mechanism. FIG. 5A is a cross-sectional view, taken along line A-A of FIG. 4A. FIG. 5B is a cross-sectional view, taken along line B-B of FIG. 4B. FIG. 5C is a cross-sectional view, taken along line C-C of FIG. 4C.

The example hinge mechanism 400 includes a first pivot pin 410 and a second pivot pin 420 that guide a flex cable 430 through the example hinge mechanism 400. In some examples, positions of the first pivot pin 410 and the second pivot pin 420 are maintained relative to the front frame portion 120 and the arm portion 130 of the example frame 102 by support structure 440. In some examples, the first pivot pin 410 is coupled to a shoulder portion 450 provided as part of the hinge mechanism 400. In some examples, the first pivot pin 410 is coupled to the shoulder portion 450 provided as part of the front frame portion 120 of the frame 102 of the head mounted wearable device 100. In some examples, the second pivot pin 420 is coupled to a shoulder portion 460 provided as part of the hinge mechanism 400. In some examples, the second pivot pin 420 is coupled to the shoulder portion 460 provided as part of the arm portion 130 of the frame 102 of the head mounted wearable device 100. In some examples, the support structure 440 includes, for example, end caps at opposite end portions of the first pivot pin 410 and the second pivot pin 420, that maintain a position of the first pivot pin 410 relative to the front frame portion 120, and maintain a position of the second pivot pin 420 relative to the arm portion 130 of the frame 102. In some examples, the support structure 440 extends between the end portions of the first pivot pin 410, and end portions of the second pivot pin 420.

In some examples, the first pivot pin 410 includes a shaft portion 412 that defines a rotational axis of the first pivot pin 410, and a cam surface 414 that is offset from the rotational axis R1. In some examples, the second pivot pin 420 includes a shaft portion 422 that defines a rotational axis R2 of the second pivot pin 420, and a cam surface 424 that is offset from the rotational axis R2. The cam surface 414 of the first pivot pin 410 and the cam surface 424 of the second pivot pin 420 guide the flex cable 430 through the hinge mechanism 400 and through the bending motion illustrated in FIGS. 4A-5C. The offset of the cam surfaces 414, 424 from the axes of rotation R1, R2 of the first and second pivots pins 410, 420 provides for rotation of the arm portion 130 relative to the front frame portion 120, with the flex cable 430 running through the hinge mechanism 400, relying on a reduced amount of flex, or elongation, or additional length of the flex cable 430. In some examples, the offset of the cam surface 414 from the rotational axis R1 of the first pivot pin 410 and the offset of the cam surface 424 from the rotational axis R2 of the second pivot pin 420 allow for an approximately degree bend in the flex cable 430, with negligible/substantially no change in length/additional length of the flex cable 430 to accommodate this bending. For example, a length of the flex cable 430 can remain substantially constant, from a point at which the flex cable 430 enters the hinge mechanism 400 to a point at which the flex cable 430 exits the hinge mechanism 400. This is illustrated schematically in FIGS. 3A and 3B.

In some examples, the first pivot pin 410 and/or the second pivot pin 420 may be implemented as rollers. Configuring the first pivot pin 410 and the second pivot pin 420 as rollers may provide for reduced friction with the flex cable 430, and reduced wear on the flex cable 430 over time.

Figure 6A:
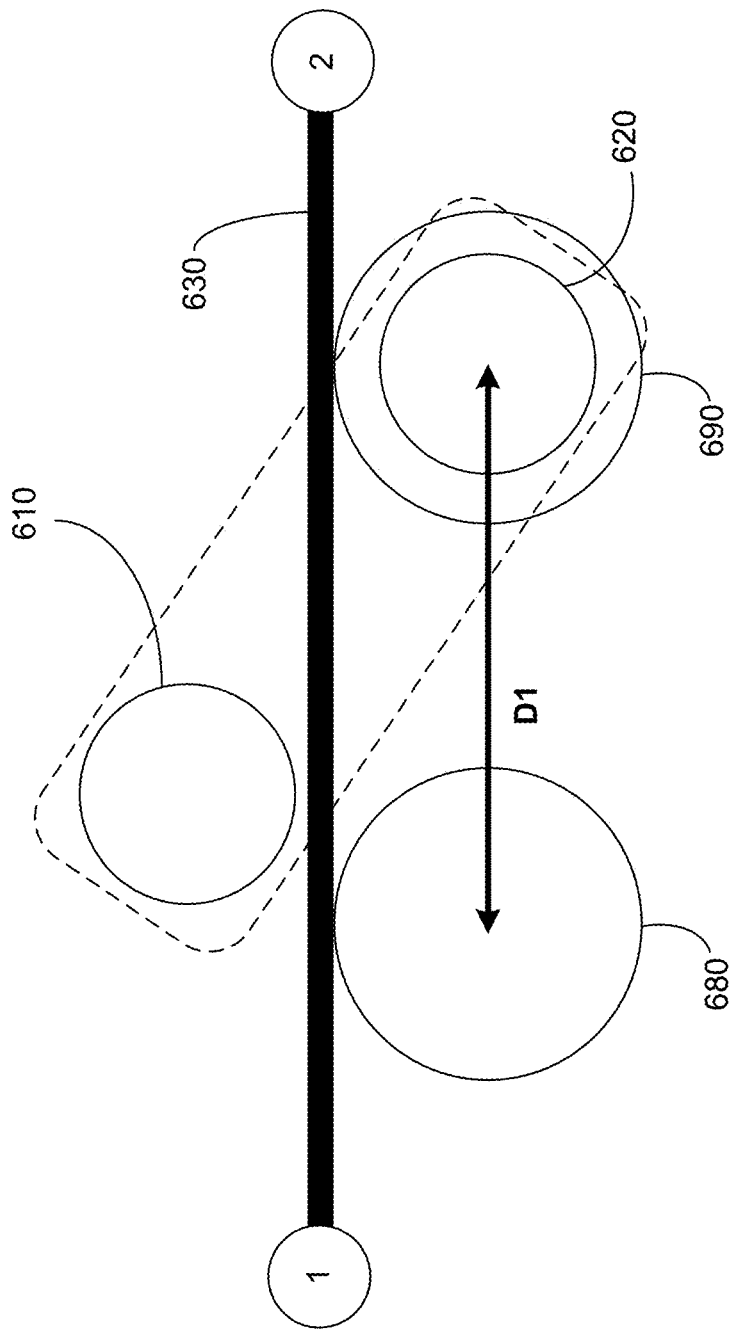
FIGS. 6A and 6B are schematic diagrams illustrating operation of an offset multi-pivot hinge mechanism, in accordance with implementations described herein
Figure 6B:
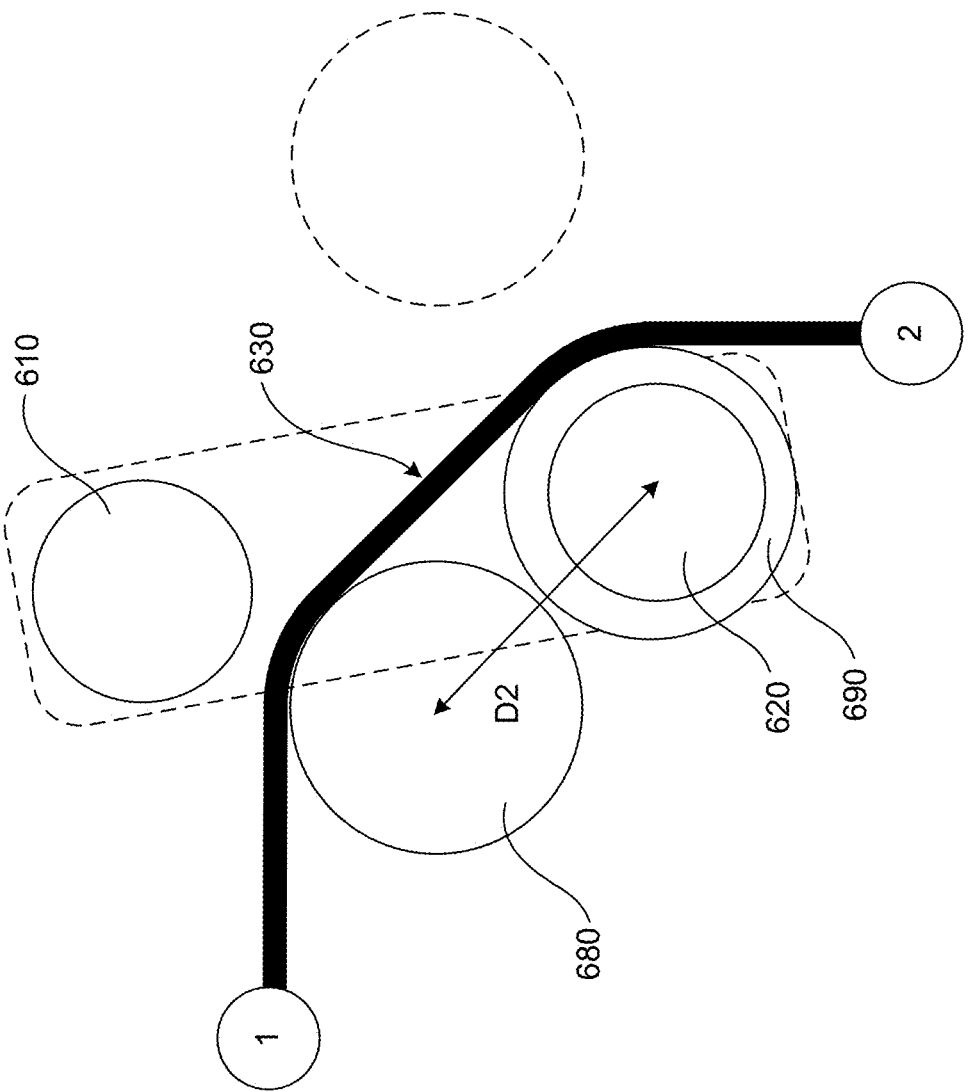

FIGS. 6A and 6B are schematic illustrations of the operation of a multi-pivot hinge mechanism, in accordance with implementations described herein. In particular, FIGS. 6A and 6B illustrate the operation of a dual pivot hinge arrangement in which a first hinge pivot 610 is offset from a second hinge pivot 620, with a flex cable 630 positioned therebetween. The example dual pivot hinge arrangement shown in FIGS. 6A and 6B includes a first bend pivot 680 and a second bend pivot 690. In this example, the first hinge pivot 610 is offset from, or eccentric from the first bend pivot 680. This allows the length of the flex cable 630 to be maintained through the range of motion of the hinge mechanism, for example, through substantially the full range of motion of the hinge mechanism, from a point at which the flex cable 630 enters the hinge mechanism to a point at which the flex cable 630 enters the hinge mechanism (i.e., points 1 and 2 shown in FIGS. 6A and 6B). In some examples, this may be through an approximately 90 degree range of motion, as in the schematic illustration shown in FIGS. 6A and 6B.

In particular, in the schematic illustration shown in FIGS. 6A and 6B, as the hinge mechanism moves from the open configuration shown in FIG. 6A to the closed configuration shown in FIG. 6B, a distance separating the first bend pivot 680 and the second bend pivot 690 changes, such that the separation distance between the first bend pivot 680 and the second bend pivot 690 is decreased. That is, the distance D2 between the first bend pivot 680 and the second bend pivot 690 in the closed position of the hinge mechanism shown in FIG. 6B is less than the distance D1 between the first bend pivot 680 and the second bend pivot 690 in the open position of the hinge mechanism shown in FIG. 6A. This allows the length of the flex cable 630, i.e., the distance between point 1 and point 2 shown in FIGS. 6A and 6B, to remain substantially constant through the range of motion of the hinge mechanism, or through the substantially full range of motion of the hinge mechanism.

Figure 7:
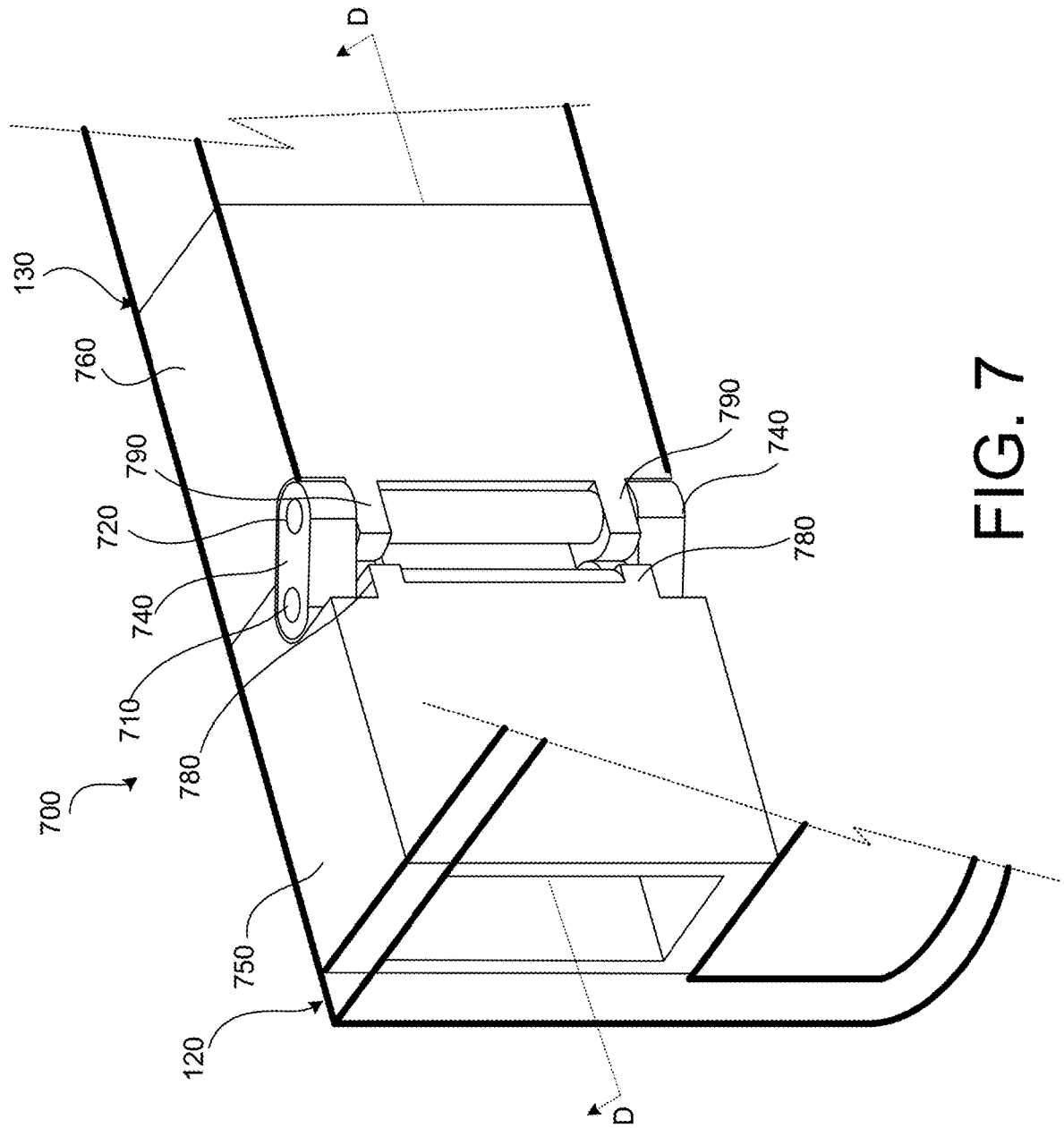
FIG. 7 is a perspective view of a fully open position of an example hinge mechanism, in accordance with implementations described herein.
Figure 8A:
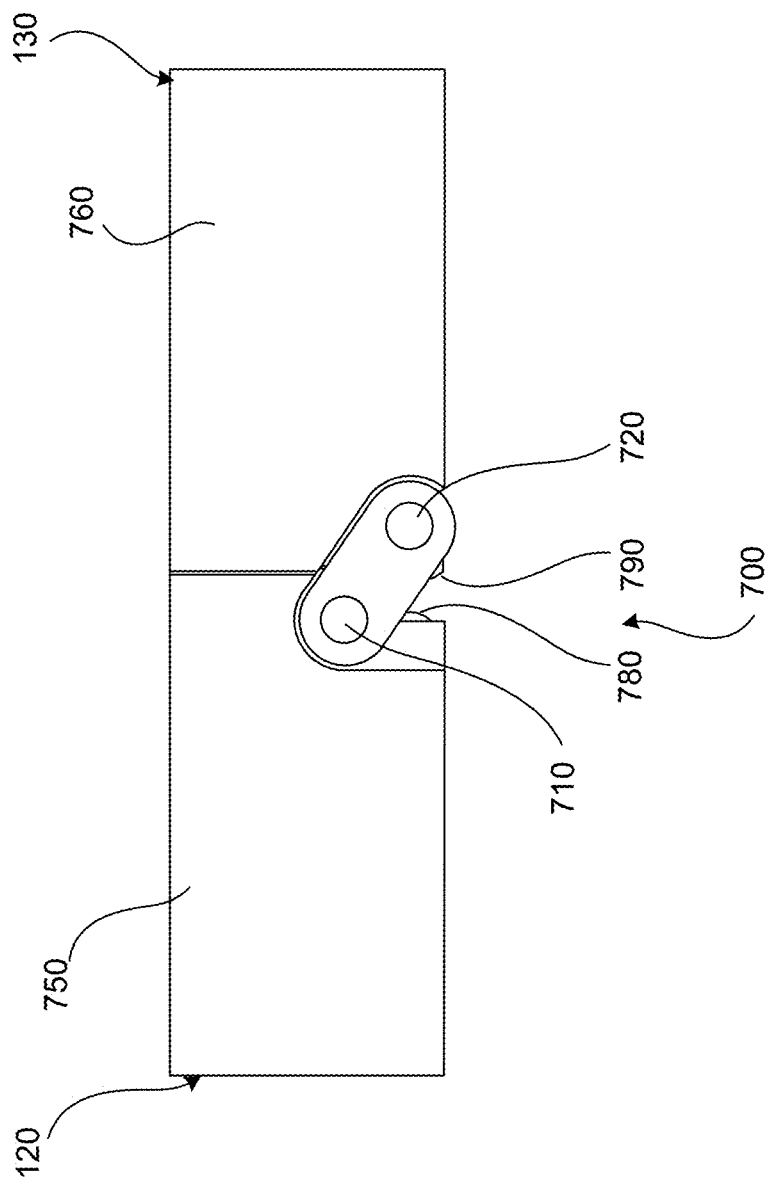
FIG. 8A is a top view of the example hinge mechanism shown in FIG. 7, in a fully open position.
Figure 8B:
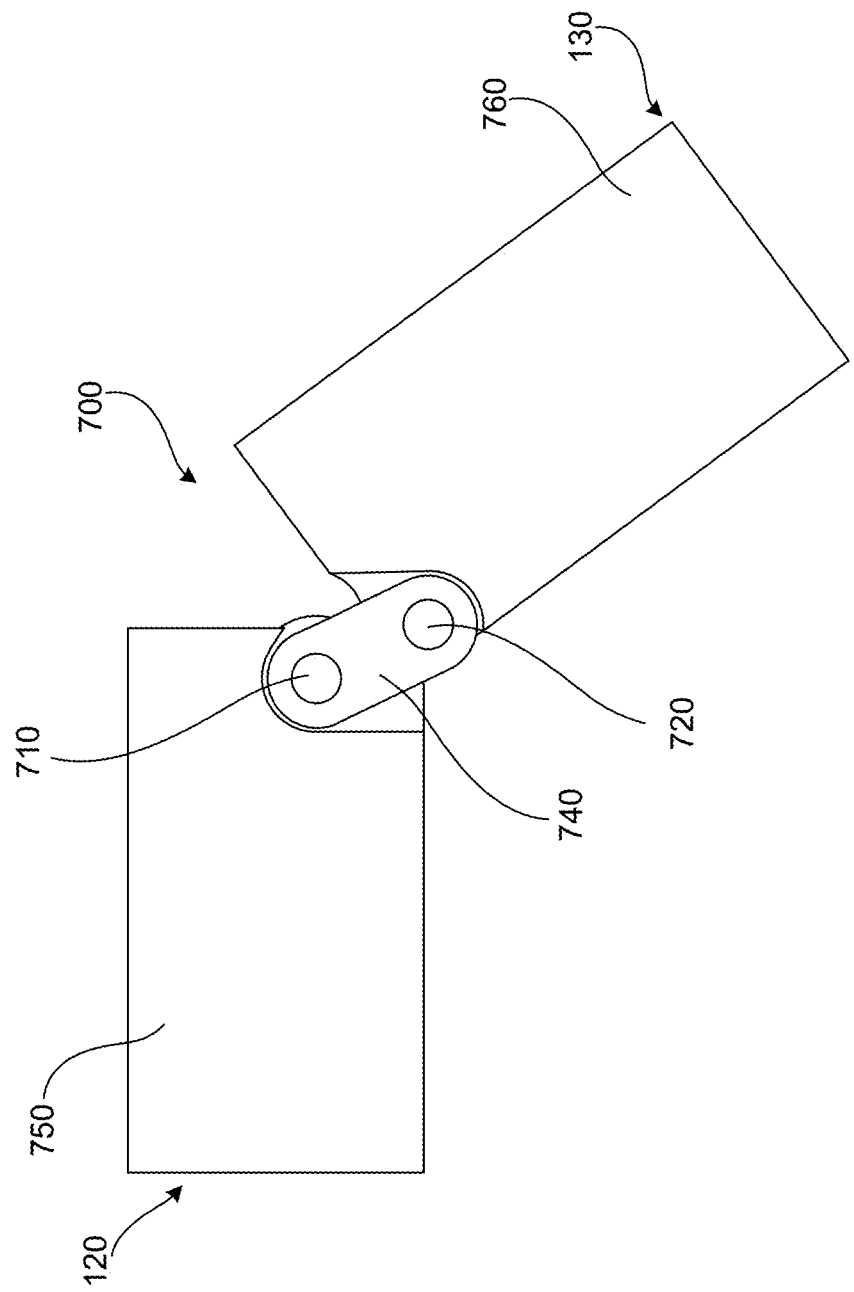
FIG. 8B is a top view of the example hinge mechanism shown in FIG. 7, in a partially closed position.
Figure 9A:
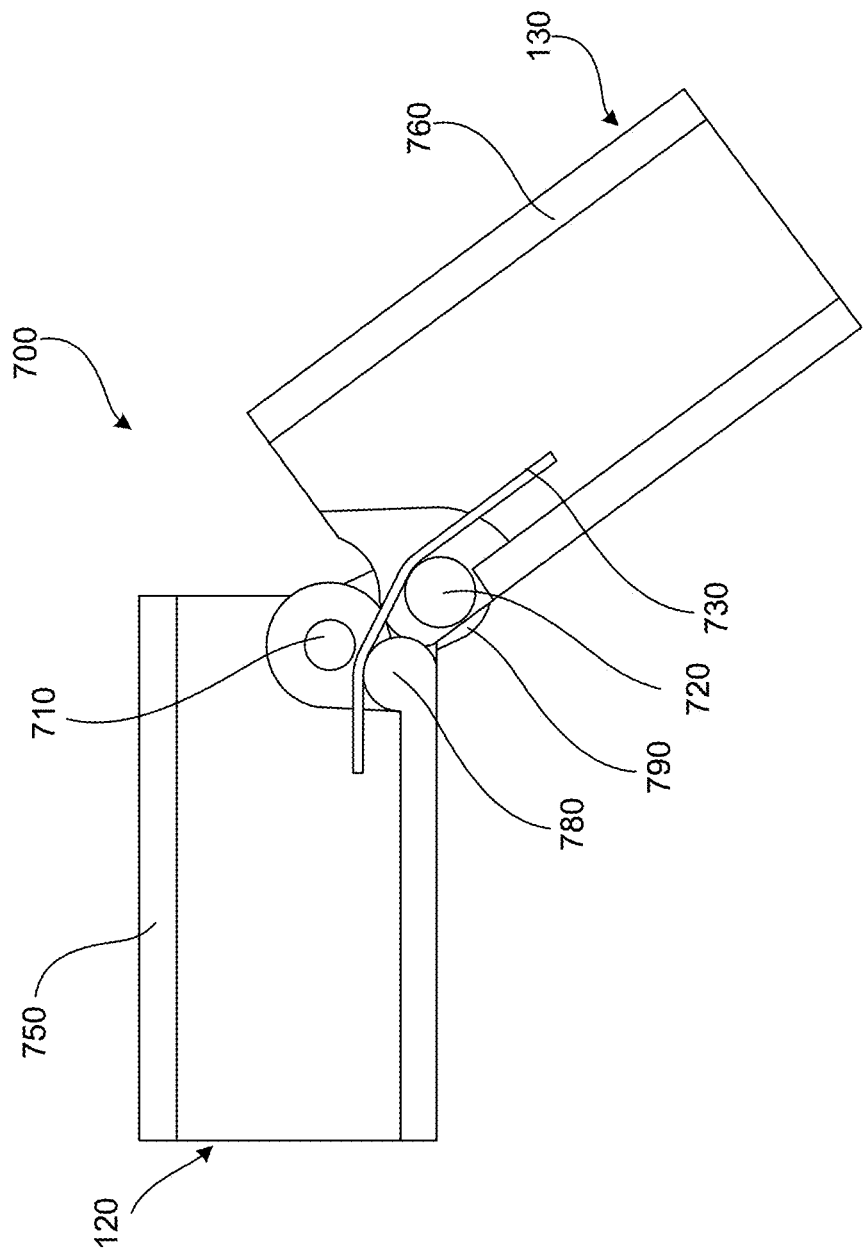
FIG. 9A is a cross-sectional view, taken along line D-D of FIG. 7, of the example hinge mechanism shown in FIG. 7 in the partially closed position.
Figure 9B:
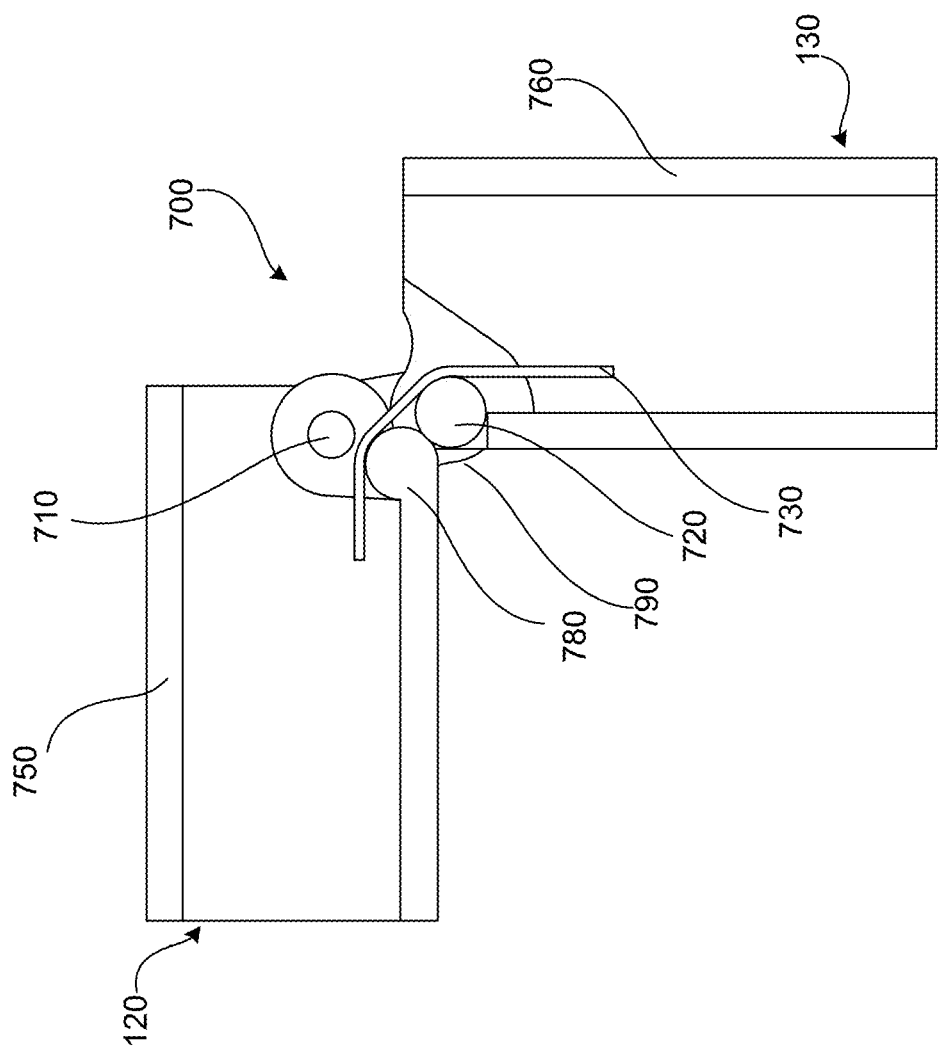
FIG. 9B is a cross-sectional view, taken along line D-D of FIG. 7, of the example hinge mechanism shown in FIG. 7 in the fully closed position.

FIG. 7 is a perspective view of an example hinge mechanism 700, in accordance with implementations described herein. The example hinge mechanism 700 shown in FIG. 7 is an offset dual pivot hinge mechanism 700, implementing the concepts described above with respect to FIGS. 6A and 6B. FIGS. 8A-9B illustrate operation of an example hinge mechanism 700, in accordance with implementations described herein. In the example arrangement shown in FIGS. 7-9B, the example hinge mechanism 400 is provided in at the hinge portion 140 of the example head mounted wearable device 100, providing for rotation of the arm portion 130 relative to the front frame portion 120 of the frame 102 of the head mounted wearable device 100. FIG. 8A is a top view of the example hinge mechanism 700 in a fully open position of the arm portion 130 relative to the front frame portion 120 of the frame 102. FIG. 8B is a top view of the hinge mechanism 700 in a partially closed position of the arm portion 130 relative to the front frame portion 120 of the frame 102. FIG. 8C is a top view of the hinge mechanism 700 in a fully closed position of the arm portion 130 relative to the front frame portion 120 of the frame 102. FIGS. 9A and 9B are cross-sectional views, taken along line D-D of FIG. 7. In particular, FIG. 9A is a cross-sectional view of the hinge mechanism 700 in the partially closed position shown in FIG. 8B. FIG. 9B is a cross-sectional view of the hinge mechanism 700 in the fully closed position shown in FIG. 8C.

The example hinge mechanism 700 includes a first pivot pin 710, and a second pivot pin 720 that is offset from the first pivot pin 710. A first guide pin 780 is provided at a position corresponding to the first pivot pin 710. In this example arrangement, the first guide pin 780 is positioned at an opposite side of a flex cable 730 from the first pivot pin 710. A second guide pin 790 is provided at a position corresponding to the second pivot pin 720. In some examples, the second pivot pin 720 is concentrically arranged with the second guide pin 790. The first pivot pin 710, the second pivot pin 720, the first guide pin 780 and the second guide pin 790 guide the flex cable 730 between the first pivot pin 710 and the second pivot pin 720, and through the hinge mechanism 700. In some examples, the first pivot pin 710 and/or the first guide pin 780 are coupled to a shoulder portion 750 provided as part of the hinge mechanism 700. In some examples, the first pivot pin 710 and/or the first guide pin 780 are coupled to the shoulder portion 750 provided as part of the front frame portion 120 of the frame 102 of the head mounted wearable device 100. In some examples, the second pivot pin 720 and/or the second guide pin 790 are coupled to a shoulder portion 760 provided as part of the hinge mechanism 700. In some examples, the second pivot pin 720 and/or the second guide pin 790 are coupled to the shoulder portion 760 provided as part of the arm portion 130 of the frame 102 of the head mounted wearable device 100.

In some examples, the hinge mechanism 700 includes support structure 740 that helps maintain a position of the first pivot pin 710 and/or the first guide pin 780 relative to the shoulder portion 750, and that helps maintain a position of the second pivot pin 720 and/or second guide pin 790 relative to the shoulder portion 760. In some examples, the support structure 740 includes, for example, end caps at opposite end portions of the first and second pivot pins 710, 720. In some examples, the support structure 740 extends between the end portions of the first pivot pin 710, and between end portions of the second pivot pin 720.

The example hinge mechanism 700 described above with respect to FIGS. 7-9B provides for approximately 90 degree bending of the flex cable 730 through the hinge mechanism 700 through the use of two approximately 45 degree bends. This arrangement reduces local strain imparted on the flex cable 730 during bending, when compared to the use of a single 90 degree bend in the flex cable 730. This arrangement provides for this 90 degree bending of the flex cable 730 through the range of motion, i.e., substantially full range of pivoting motion, of the hinge mechanism 700, with negligible/substantially no change in length/additional length of the flex cable 730 to accommodate this bending.

The example hinge mechanism 700 described above with respect to FIGS. 7-9B incorporates first and second pivot pins 710, 720 having a substantially circular cross-sectional shape. In the example shown in FIGS. 7-9B, the first and second guide pins 780, 790 also have a substantially circular cross-sectional shape. The principles described herein can be applied to bend pivots having other cross-sectional shapes that facilitate the gliding and/or desired bending of the flex cable 730 along a surface thereof. This includes, for example, a configuration in which only a portion of the bend pivot contacting/guiding the flex c able 730 is contoured to facilitate the desired gliding/bending of the flex cable 730. Thus, in some examples, geometry of the bend pivots is only constrained in an area/portion of the bend pivots providing for the desired 45 degree bending of the flex cable 730.

A number of implementations have been described. Nevertheless, it will be understood that various modifications may be made without departing from the spirit and scope of the specification. Any logic flows depicted do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A wearable computing device, comprising:
   a frame, including:
      a front frame portion; and
      an arm portion coupled to the front frame portion;
   a hinge mechanism rotatably coupling the arm portion to the front frame portion of the frame, the hinge mechanism including:
      a first pivot pin coupled to the front frame portion;
      a second pivot pin coupled to the arm portion; and
      a coupling structure coupling corresponding end portions of the first pivot pin and the second pivot pin; and
   a flex cable extending through the hinge mechanism, connecting electronic components received in the front frame portion and electronic components received in the arm portion of the frame,
   wherein the first pivot pin and the second pivot pin are configured to guide a bending of the flex cable through a substantially full range of motion of the hinge mechanism, wherein the substantially full range of motion of the hinge mechanism is approximately 90 degrees, and the first pivot pin provides for approximately 45 degrees of bending of flex cable, and the second pivot pin provides for approximately 45 degrees of bending of the flex cable.

2. The wearable computing device of claim 1, wherein a length of the flex cable, from a point at which the flex cable enters the hinge mechanism to a point at which the flex cable exits the hinge mechanism, is substantially the same throughout the range of motion of the hinge mechanism.

3. The wearable computing device of claim 1, wherein
   the first pivot pin includes a cam surface that is offset from an axis of rotation of the first pivot pin, wherein the cam surface defines a guide surface for guiding the bending of the flex cable at the first pivot pin, and
   the second pivot pin includes a cam surface that is offset from an axis of rotation of the second pivot pin, wherein the cam surface defines a guide surface for guiding the bending of the flex cable at the first pivot pin.

4. The wearable computing device of claim 1, wherein the second pivot pin is positioned at an offset from the first pivot pin, such that the flex cable is positioned between the first pivot pin and the second pivot pin.

5. The wearable computing device of claim 4, wherein the hinge mechanism further comprises:
   a first guide pin; and
   a second guide pin,
   wherein the first guide pin is positioned such that the flex cable passes between the first pivot pin and the first guide pin, and the second guide pin is concentrically arranged with the second pivot pin.

6. The wearable computing device of claim 5, wherein
   in a fully open configuration of the hinge mechanism, the first guide pin and the second guide pin are separated by a first distance, and
   in a fully closed configuration of the hinge mechanism, the first guide pin and the second guide pin are separated by a second distance that is less than the first distance.

7. The wearable computing device of claim 1, wherein at least one of the first pivot pin or the second pivot pin is a roller.

8. The wearable computing device of claim 1, wherein the wearable computing device is a wearable computing device.

9. A wearable computing device, comprising:
   a frame, including:
      a front frame portion; and
      an arm portion coupled to the front frame portion;
   a hinge mechanism rotatably coupling the arm portion to the front frame portion of the frame, the hinge mechanism including:
      a first pivot pin coupled to the front frame portion;
      a second pivot pin coupled to the arm portion; and
      a coupling structure coupling corresponding end portions of the first pivot pin and the second pivot pin; and
   a flex cable extending through the hinge mechanism, connecting electronic components received in the front frame portion and electronic components received in the arm portion of the frame,
   wherein the first pivot pin and the second pivot pin are configured to guide a bending of the flex cable through a substantially full range of motion of the hinge mechanism, and wherein
   the first pivot pin includes a cam surface that is offset from an axis of rotation of the first pivot pin such that the cam surface defines a guide surface for guiding the bending of the flex cable at the first pivot pin, and
   the second pivot pin includes a cam surface that is offset from an axis of rotation of the second pivot pin such that the cam surface defines a guide surface for guiding the bending of the flex cable at the first pivot pin.

10. The wearable computing device of claim 9, wherein the first pivot pin provides for half of the bending of the flex cable associated with the substantially full range of motion of the hinge mechanism, and the second pivot pin provides for half of the bending of the flex cable associated with the substantially full range of motion of the hinge mechanism.

11. The wearable computing device of claim 9, wherein the substantially full range of motion of the hinge mechanism is approximately 90 degrees, and the first pivot pin provides for approximately 45 degrees of bending of flex cable, and the second pivot pin provides for approximately 45 degrees of bending of the flex cable.

12. The wearable computing device of claim 9, wherein a length of the flex cable, from a point at which the flex cable enters the hinge mechanism to a point at which the flex cable exits the hinge mechanism, is substantially the same throughout the range of motion of the hinge mechanism.

13. The wearable computing device of claim 9, wherein at least one of the first pivot pin or the second pivot pin is a roller.

14. The wearable computing device of claim 9, wherein the wearable computing device is a head mounted wearable computing device.

15. A wearable computing device, comprising:
   a frame, including:
      a front frame portion; and
      an arm portion coupled to the front frame portion;
   a hinge mechanism rotatably coupling the arm portion to the front frame portion of the frame; and
   a flex cable extending through the hinge mechanism, connecting electronic components received in the front frame portion and electronic components received in the arm portion of the frame, wherein the hinge mechanism includes:
      a first pivot pin coupled to the front frame portion;
      a second pivot pin coupled to the arm portion and positioned at an offset from the first pivot pin such that the flex cable is positioned between the first pivot pin and the second pivot pin;

a first guide pin;

a second guide pin concentrically arranged concentrically with the second pivot pin; and a coupling structure coupling corresponding end portions of the first pivot pin and the second pivot pin, wherein the first pivot pin, the second pivot pin, the first guide pin, and the second guide pin are configured to guide a bending of the flex cable through a substantially full range of motion of the hinge mechanism.

16. The wearable computing device of claim 15, wherein the first pivot pin provides for half of the bending of the flex cable associated with the substantially full range of motion of the hinge mechanism, and the second pivot pin provides for half of the bending of the flex cable associated with the substantially full range of motion of the hinge mechanism.

17. The wearable computing device of claim 15, wherein the substantially full range of motion of the hinge mechanism is approximately 90 degrees, and the first pivot pin provides for approximately 45 degrees of bending of flex cable, and the second pivot pin provides for approximately 45 degrees of bending of the flex cable.

18. The wearable computing device of claim 15, wherein
in a fully open configuration of the hinge mechanism, the first guide pin and the second guide pin are separated by a first distance, and
in a fully closed configuration of the hinge mechanism, the first guide pin and the second guide pin are separated by a second distance that is less than the first distance.

19. The wearable computing device of claim 15, wherein the wearable computing device is a head mounted wearable computing device.

* * * * *